(12) United States Patent
Yamaguchi

(10) Patent No.: US 10,051,143 B2
(45) Date of Patent: Aug. 14, 2018

(54) MOBILE INFORMATION PROCESSING APPARATUS, IMAGE OUTPUT APPARATUS, IMAGE OUTPUT SYSTEM, AND NON-TRANSITORY COMPUTER READABLE MEDIUM

(71) Applicant: FUJI XEROX CO., LTD., Tokyo (JP)

(72) Inventor: Hiroshi Yamaguchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/341,732

(22) Filed: Nov. 2, 2016

(65) Prior Publication Data

US 2017/0195513 A1 Jul. 6, 2017

(30) Foreign Application Priority Data

Jan. 5, 2016 (JP) ................................ 2016-000501
Jan. 19, 2016 (JP) ................................ 2016-007774
Jun. 8, 2016 (JP) ................................ 2016-114088

(51) Int. Cl.
*H04N 1/32* (2006.01)
*H04N 1/00* (2006.01)
*H04N 1/327* (2006.01)

(52) U.S. Cl.
CPC ..... *H04N 1/32117* (2013.01); *H04N 1/00973* (2013.01); *H04N 1/32765* (2013.01);
(Continued)

(58) Field of Classification Search
CPC ........... H04N 1/32117; H04N 1/32797; H04N 1/00973; H04N 1/32765; H04N 1/32786; H04N 2201/0094; H04N 2201/3207
(Continued)

(56) References Cited

U.S. PATENT DOCUMENTS

2006/0256959 A1* 11/2006 Hymes .................... H04M 1/26
379/433.04
2007/0147843 A1* 6/2007 Fujiwara ............ H04B 10/1143
398/118

(Continued)

FOREIGN PATENT DOCUMENTS

JP 2007-164400 A 6/2007
JP 2007-189348 A 7/2007
(Continued)

OTHER PUBLICATIONS

Communication dated Nov. 29, 2016 from the Japanese Patent Office in counterpart application No. 2016-114088.
(Continued)

*Primary Examiner* — Allen H Nguyen
(74) *Attorney, Agent, or Firm* — Sughrue Mion, PLLC

(57) ABSTRACT

A mobile information processing apparatus includes a receiver and a transmitter. The receiver receives destination information via visible light communication. The destination information is information for identifying an image output apparatus as a destination of second communication different from the visible light communication. The transmitter transmits second information and a print instruction to the image output apparatus via the second communication in accordance with the destination information. The second information is information indicating receipt of the destination information by the receiver.

10 Claims, 22 Drawing Sheets

(52) U.S. Cl.
CPC ..... *H04N 1/32786* (2013.01); *H04N 1/32797* (2013.01); *H04N 2201/0094* (2013.01); *H04N 2201/3207* (2013.01)

(58) Field of Classification Search
USPC ....................................................... 358/1.15
See application file for complete search history.

(56) References Cited

U.S. PATENT DOCUMENTS

| | | | | |
|---|---|---|---|---|
| 2009/0268023 | A1* | 10/2009 | Hsieh | H04N 5/2354 348/143 |
| 2012/0045215 | A1* | 2/2012 | Kim | H04B 10/116 398/128 |
| 2014/0218765 | A1 | 8/2014 | Sawayanagi et al. | |
| 2015/0186088 | A1 | 7/2015 | Iwashima | |
| 2016/0099774 | A1* | 4/2016 | Sim | H04B 10/116 398/115 |

FOREIGN PATENT DOCUMENTS

| | | |
|---|---|---|
| JP | 2007-201828 A | 8/2007 |
| JP | 2008-186161 A | 8/2008 |
| JP | 2010-114492 A | 5/2010 |
| JP | 2014-007624 A | 1/2014 |
| JP | 2014-150474 A | 8/2014 |
| JP | 2014-180792 A | 9/2014 |
| JP | 2015-024626 A | 2/2015 |
| JP | 2015-126504 A | 7/2015 |
| JP | 2015-210597 A | 11/2015 |
| JP | 2016-007774 A | 1/2016 |
| JP | 2016-092282 A | 5/2016 |

OTHER PUBLICATIONS

Japanese Office Action of Japanese Application No. 2016-114088 dated Sep. 13, 2016.

* cited by examiner

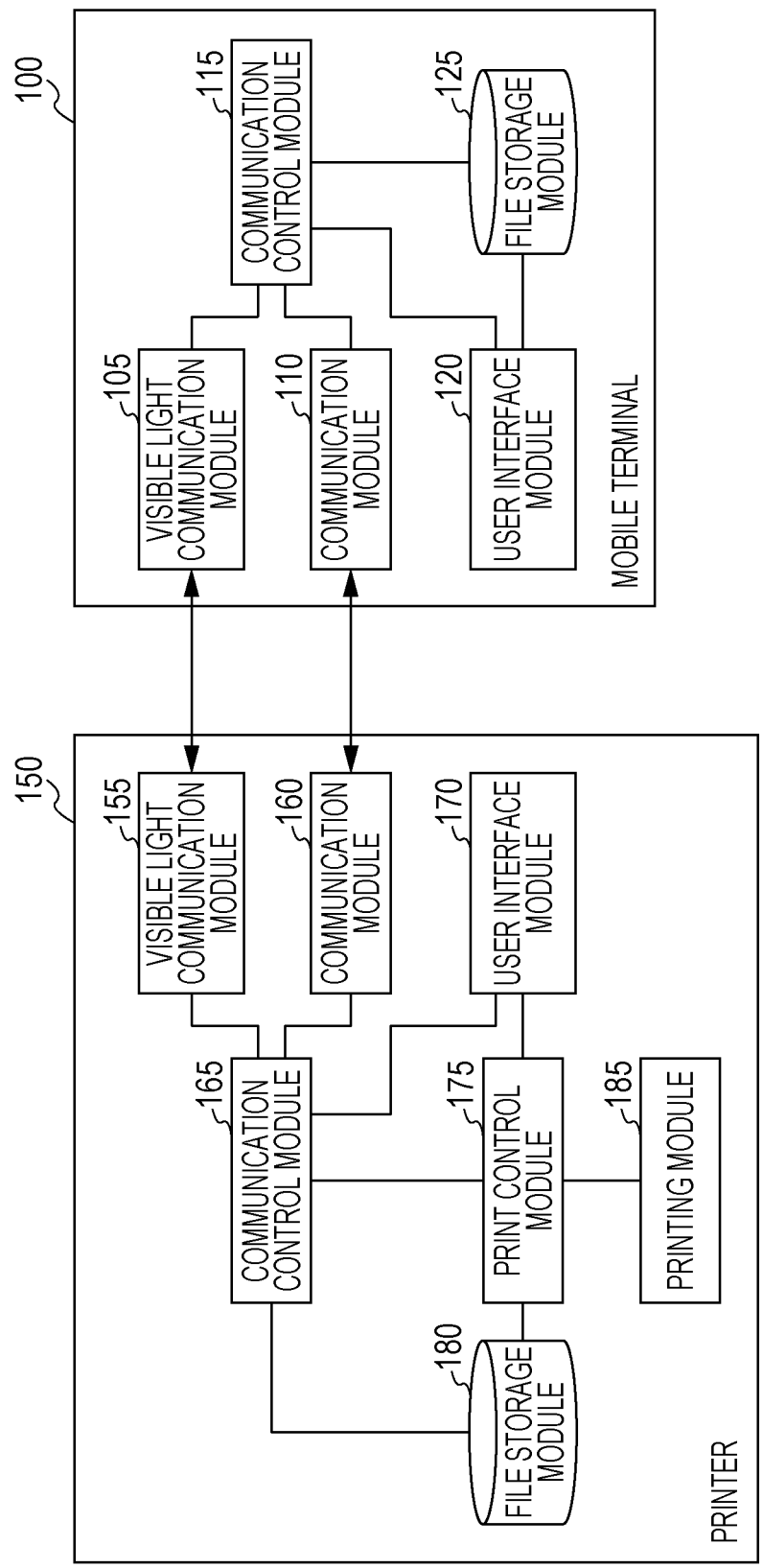

FIG. 2A
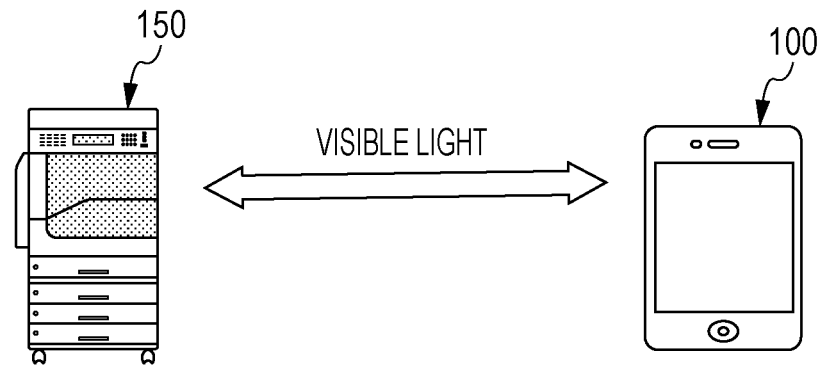
FIG. 2B1
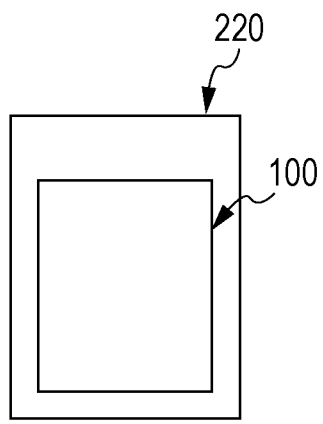
FIG. 2B2
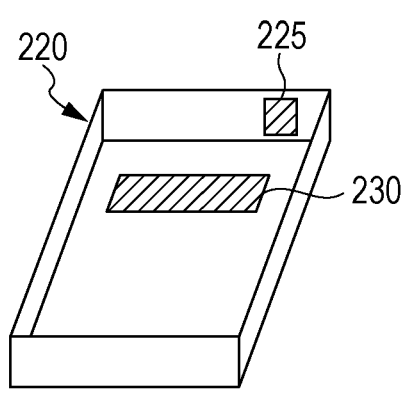
FIG. 2B3
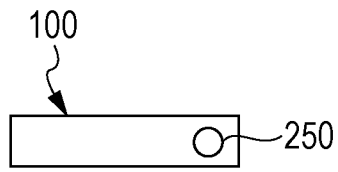
FIG. 2B4
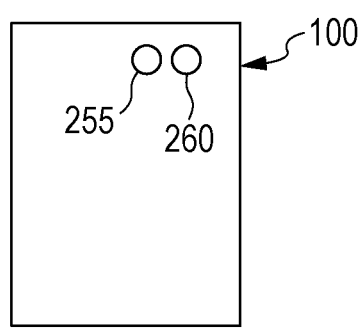

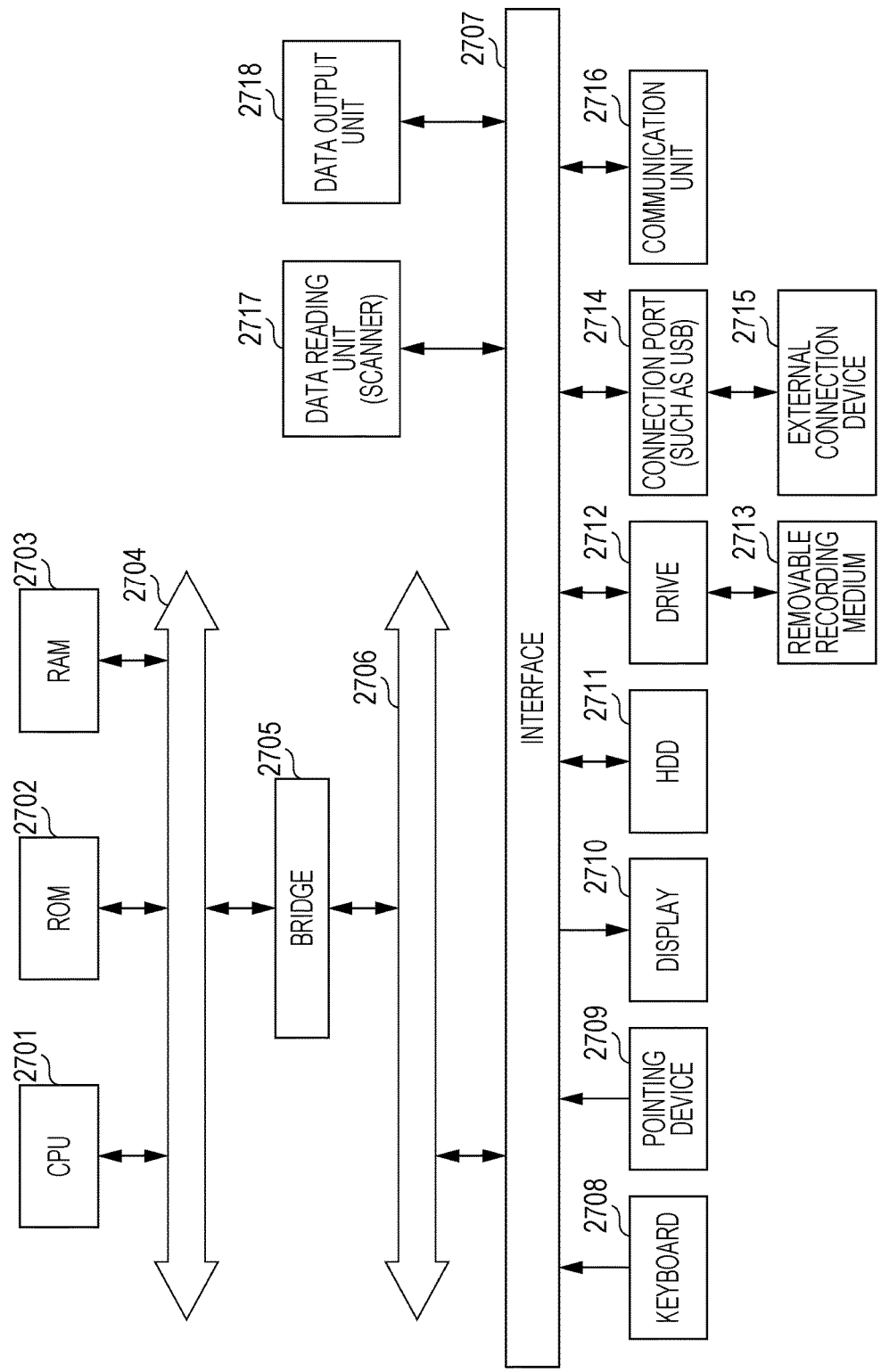

MOBILE INFORMATION PROCESSING APPARATUS, IMAGE OUTPUT APPARATUS, IMAGE OUTPUT SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-000501 filed Jan. 5, 2016, Japanese Patent Application No. 2016-007774 filed Jan. 19, 2016, and Japanese Patent Application No. 2016-114088 filed Jun. 8, 2016.

BACKGROUND (i) Technical Field

The present invention relates to a mobile information processing apparatus, an image output apparatus, an image output system, and a non-transitory computer readable medium.

(ii) Related Art

It is common to transmit information for identifying an image output apparatus via visible light communication, send a print instruction from a mobile information processing apparatus, and perform printing by using the image output apparatus.

SUMMARY

According to an aspect of the invention, there is provided a mobile information processing apparatus including a receiver and a transmitter. The receiver receives destination information via visible light communication. The destination information is information for identifying an image output apparatus as a destination of second communication different from the visible light communication. The transmitter transmits second information and a print instruction to the image output apparatus via the second communication in accordance with the destination information. The second information is information indicating receipt of the destination information by the receiver.

BRIEF DESCRIPTION OF THE DRAWINGS

An exemplary embodiment of the present invention will be described in detail based on the following figures, wherein:

FIG. 1 is a conceptual module configuration diagram of an example configuration according to the exemplary embodiment;

FIGS. 2A and 2B1 through 2B4 illustrate an example configuration of a system according to the exemplary embodiment;

FIG. 4 is a flowchart illustrating the example process according to the exemplary embodiment;

FIG. 27 is a block diagram illustrating an example hardware configuration of a computer that implements the exemplary embodiment.

DETAILED DESCRIPTION

Figure 3:
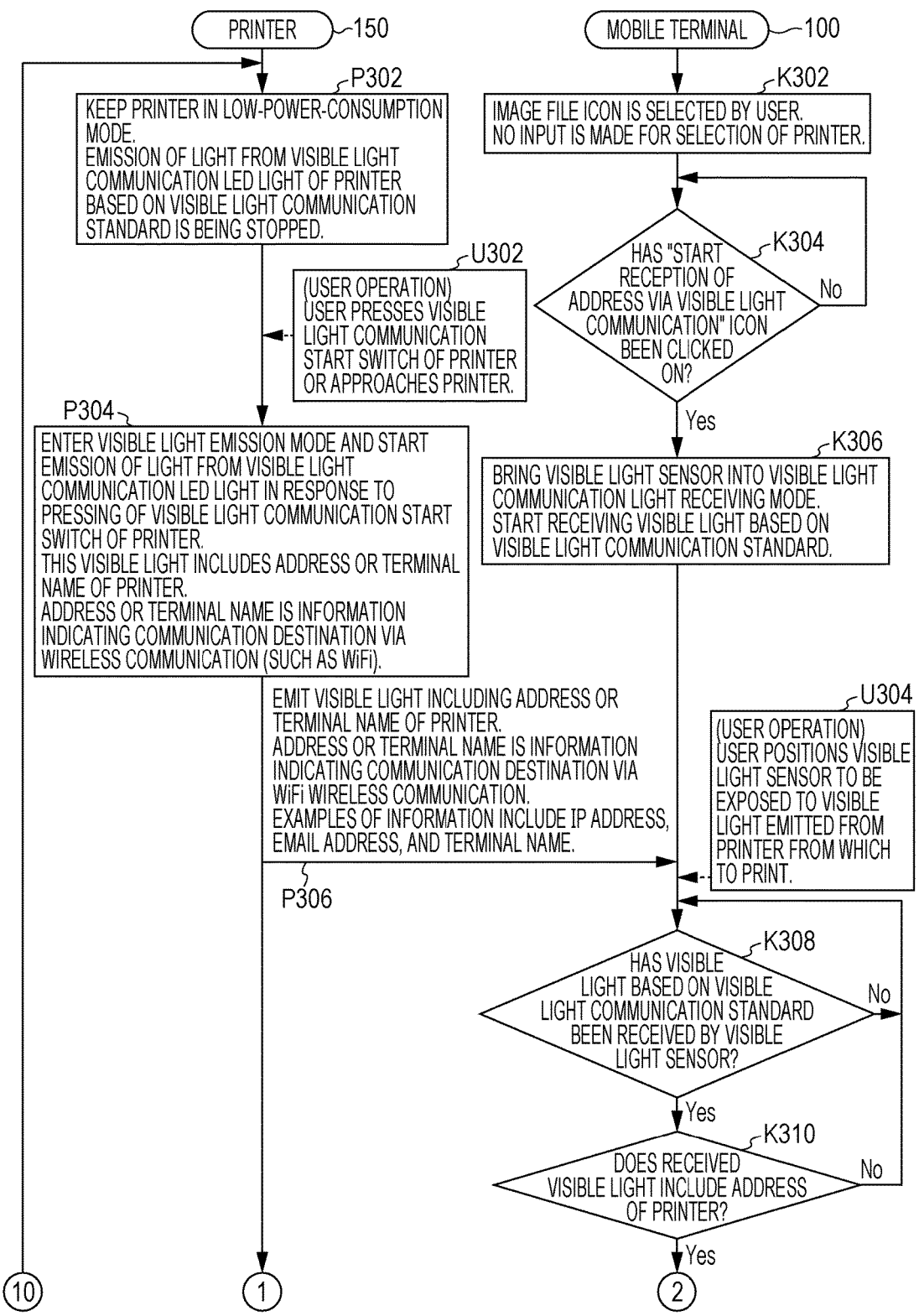
FIG. 3 is a flowchart illustrating an example process according to the exemplary embodiment.

An exemplary embodiment of the present invention will be described hereinafter with reference to the drawings.

FIG. 1 is a conceptual module configuration diagram of an example configuration according to this exemplary embodiment.

The term "module" generally refers to a logically separable component such as in software (computer program) or hardware. Thus, each module in this exemplary embodiment refers not only to a module in a computer program but also to a module in a hardware configuration. Accordingly, this exemplary embodiment is also directed to a computer program for causing a computer to function as these modules (i.e., a program for causing the computer to execute the respective procedures, a program for causing the computer to function as the respective units, or a program for causing the computer to implement the respective functions), as well as to a system and a method. While the expressions "store data" and "data is stored" and their equivalent expressions are used for convenience of description, such expressions have a meaning of making a storage device store data or controlling a storage device to store data if an exemplary embodiment is directed to a computer program. While each module may be given a single function, each module may be constituted by a single program or multiple modules may be constituted by a single program in actual implementation.

Conversely, a single module may be constituted by multiple programs. In addition, multiple modules may be executed by a single computer, or a single module may be executed by multiple computers in a distributed or parallel environment. As an alternative, a single module may include another module. In the following, the term "connection" refers not only to a physical connection but also to a logical connection (such as exchanging of data, sending instructions, and a reference relationship between data). The term "predetermined" refers to a state in which certain information is determined before intended processing is to be performed, and is used to include not only a state in which such information is determined at a time point prior to the commencement of processing according to this exemplary embodiment but also a state in which the information is determined at a time point prior to intended processing even after the processing according to this exemplary embodiment has commenced, depending on the condition or the state at that time or depending on the condition or the state until that time. When there are multiple "predetermined values", the values may be different or two or more (or all) of the values may be identical. A description having a meaning of "if A, then B" is used to mean: "it is determined whether or not A, and B if it is determined that A" unless the determination of whether or not A is required.

Furthermore, the term "system", "apparatus", or "device" is used to include a configuration in which multiple computers, hardware components, apparatuses, devices, or other suitable elements are connected to each other via a communication medium such as a network (including one-to-one communication connections), and what is implemented by a single computer, hardware component, apparatus, device, or suitable element. The terms "apparatus", "device", and "system" are used synonymously. It is to be understood that the term "system" does not include what is merely a social "mechanism" (social system), which is a kind of artificial arrangement.

Moreover, target information is read from a storage device for each processing operation that is to be performed by an individual module or, if multiple processing operations are to be performed within a module, for each of the multiple processing operations. After the processing is performed, the result of the processing is written to the storage device. Thus, the reading of information from the storage device before the processing of the information is to be performed and the writing of information to the storage device after the processing of the information has been performed are not described in some cases. Examples of the storage device used here may include a hard disk, a random access memory (RAM), an external storage medium, a storage device connected via a communication line, and a register within a central processing unit (CPU).

A system according to this exemplary embodiment is constituted by a mobile terminal 100 and a printer 150. The mobile terminal 100 is configured to send a print instruction (also referred to as "print job") to the printer 150. The printer 150 is configured to perform printing upon receipt of a print instruction from the mobile terminal 100. For example, in a setting in which a user temporarily uses the printer 150 (such as in the case where the user uses the printer 150 one time in a location during a business trip), it may be bothersome for the user to set settings for establishing communication between the mobile terminal 100 and the printer 150. The system according to this exemplary embodiment may enable the user to send, even in this case, a print instruction by using their mobile terminal 100, without causing the user to perform a communication setting operation (without causing the user to at least select the printer 150 as the destination of the print instruction) to perform printing by using the printer 150.

Visible light communication is used as a method for communication between the mobile terminal 100 and the printer 150 (in particular, communication from the printer 150 to the mobile terminal 100).

Visible light communication is a way of communication that uses visible light emitted from an illumination source such as a light emitting diode (LED) and modulated by changing the parameters of the visible light (the parameters include the intensity, frequency, and amplitude of the visible light, and how frequently the visible light is emitted). The following are examples of standards for visible light communication.

JEITA CP-1221/1222/1223 (Japan Electronics and Information Technology Industries Association)

These standards are used principally for illumination light communication with 4.8 kbps each way.

JEITA CP-1221 Visible Light Communications System, March 2007
   http://www.jeita.or.jp/japanese/standard/book/CP-1221
     JEITA CP-1222 Visible Light ID System, June 2007
   http://www.jeita.or.jp/japanese/standard/book/CP-1222
     JEITA CP-1223 Visible Light Beacon System, May 2013
   http://www.jeita.or.jp/japanese/standard/book/CP-1223

The standards listed above provide various applications, such as identifying an object, providing position information, and establishing various guidance systems, by causing a visible light source to transmit via radiation brief information or identification (ID) information specific to the visible light source.

ARIB STD-T50 Ver. 4.0 (Association of Radio Industries and Businesses), December 2009

This standard is a standard for optical local area network (LAN) (visible light extension of infrared light LAN) that uses visible light for downlink and infrared light for uplink.
   http://www.arib.or.jp/english/html/overview/doc/1-STD-T50v4_0.pdf IrDA "Visible Light Communication Standard" Ver. 1.0 (the joint cooperative agreement between the Visible Light Communications Consortium (VLCC) and the Infrared Data Association (IrDA)), February 2009

This standard is a standard that is an extension to and compatible with IrDA visible light communication technology.

Institute of Electrical and Electronics Engineers (IEEE) 802.15.7 (January 2009)

This standard is a visible light communication standard that has been released.

IEEE 802.15.SG7a

This standard is a visible light communication standard that uses image sensors.

The printer 150 emits light for visible light communication to the mobile terminal 100 and transmits to the mobile terminal 100 information (destination information) for identifying the printer 150 to establish communication with the printer 150. The term "communication" (an example of second communication) in the phrase "to establish communication with the printer 150", as used herein, refers to communication, other than visible light communication, that requires information for identifying a destination of the communication. Examples of the communication may include wireless communication such as that via WiFi (Wireless Fidelity) or Bluetooth (registered trademark), which is a standard for short-range wireless communication.

The term "information for identifying the printer 150" refers to information for identifying the other end of communication (such as pairing), and the information typically includes the name, address, etc. of the device, specific examples of which include an Internet protocol (IP) address, a Media Access Control (MAC) address, an email address, a terminal name.

The mobile terminal 100 receives the information (i.e., the information for identifying the printer 150 to establish communication with the printer 150) from the printer 150 via visible light communication.

Then, the mobile terminal 100 performs the setting of communication (i.e., communication, other than visible light communication, that is set by using the information) in accordance with the information, and transmits a print instruction to the printer 150 by using the communication.

The printer 150 receives the print instruction from the mobile terminal 100 via the communication, and performs printing in accordance with the print instruction.

The series of processes described above does not involve an operation of selecting the destination of the print instruction by using the mobile terminal 100.

As in the example illustrated in FIG. 1, the mobile terminal 100 includes a visible light communication module 105, a communication module 110, a communication control module 115, a user interface module 120, and a file storage module 125. The mobile terminal 100 is typically a portable device, examples of which include mobile phones (including smartphones), notebook personal computers (PCs), and wearable terminals (e.g., wristwatch-type terminals, glasses-type terminals, etc.). The mobile terminal 100 is capable of visible light communication (at least visible light communication for transmission), and is designed to transmit a print instruction to the printer 150 accordance with a user operation.

The visible light communication module 105 is connected to the communication control module 115. The visible light communication module 105 performs visible light communication (receives, demodulates, modulates and emits light for visible light communication). The visible light communication module 105 receives information for identifying the printer 150 to establish communication with the printer 150 via visible light communication. The information is passed to the communication control module 115.

The visible light communication module 105 may be oriented in the same direction as that of a camera included in the mobile terminal 100. In this case, an image captured with the camera may be displayed on a display of the user interface module 120 to allow the user to check the other end of the visible light communication (i.e., the printer 150).

The communication module 110 is connected to the communication control module 115. The communication module 110 performs communication (communication other than visible light communication) with the printer 150. The communication module 110 is controlled by the communication control module 115 to transmit a print instruction to the printer 150 via the communication in accordance with the information received by the visible light communication module 105.

The communication control module 115 is connected to the visible light communication module 105, the communication module 110, the user interface module 120, and the file storage module 125. The communication control module 115 receives the information for identifying the printer 150 to establish communication with the printer 150 through the visible light communication module 105 via visible light communication.

The communication control module 115 then controls the communication module 110 to transmit a print instruction and "second information indicating receipt by the visible light communication module 105" to the printer 150 via the communication based on the information for identifying the printer 150. Visible light communication allows the user to visually identify the source from which the visible light communication originates (e.g., the printer 150), the destination at which the visible light communication is received (e.g., the mobile terminal 100), and a communication path, allowing the user to readily understand the communication range. The term "second information indicating receipt by the visible light communication module 105", as used herein, may be used to indicate "information indicating that communication is being performed in response to receipt of information for identifying the printer 150 via visible light communication", "second information indicating that the information for identifying the printer 150 has been received via visible light communication", "second information indicating that the ongoing communication is based on the information for identifying the printer 150", or "second information indicating that the ongoing communication is based on information received via visible light communication (the information for identifying the printer 150)". The phrase "transmit a print instruction (hereinafter referred to as the "former information" in this paragraph) and 'second information indicating receipt by the visible light communication module 105' (hereinafter referred to as the "latter information" in this paragraph) to the printer 150" is used to indicate that the former information and the latter information are simultaneously transmitted (for example, the former information and the latter information are included in the same packet), and is also used to refer to that the former information and the latter information may not necessarily be transmitted simultaneously, for example, that the latter information is transmitted within a predetermined period after the former information has been transmitted, that the former information is transmitted within a predetermined period after the latter information has been transmitted, or that the former information and the latter information are transmitted so as to be associated with each other.

In addition, the function of the communication control module 115 may be regarded as a function of "transmitting the print instruction and the second information only when the destination information has been received by the visible light communication module 105". The transmission of the print instruction and the second information implies that "the destination information has been received from the printer 150 via visible light communication", and is performed to notify the printer 150 that "the destination information has been received from the printer 150 via visible light communication".

The "second information" may be implemented using a flag. The flag is information indicating that information for identifying the printer 150 has been received via visible light communication. This example will be described below with reference to an example illustrated in FIGS. 3 to 6.

Alternatively, the "second information" may be implemented using identification information that is information received by the communication control module 115 from the printer 150 and that is information for identifying visible light communication. This example will be described below with reference to an example illustrated in FIGS. 16 to 19.

The communication control module 115 may further control the communication module 110 to transmit a print instruction to the printer 150 without accepting an operation input of the user for selecting the printer 150, which is the destination of the print instruction.

The communication control module 115 may further control the visible light communication module 105 to transmit an instruction for transmitting the information for identifying the printer 150. The term "instruction for transmitting the information for identifying the printer 150" refers to an instruction sent by the mobile terminal 100 to request information necessary to start communication with the printer 150.

The communication control module 115 may further control the visible light communication module 105 to stop receiving visible light communication when the "information for identifying the printer 150" is received. The reason for this is to stop the "information for identifying the printer 150" from being excessively received.

In addition, when the visible light communication module 105 receives the characteristics or state of the printer 150 from the printer 150 via visible light communication, the communication control module 115 may generate a print instruction in accordance with the characteristics or state of the printer 150. Then, the communication control module 115 may control the communication module 110 to transmit the generated print instruction.

The user interface module 120 is connected to the communication control module 115 and the file storage module 125. The user interface module 120 accepts a user operation made via a touch screen, audio, a line of sight, a gesture, a mouse, a keyboard, or the like. Examples of the user operation include sending a print instruction. Further, the user interface module 120 informs the user of information by using a liquid crystal display, a speaker, a vibrator, or any other suitable device. Upon receipt of information indicating receipt of the print instruction from the printer 150, the user interface module 120 may present the information. The user, who is presented with the information, performs an operation of stopping the visible light communication (such as stopping reception of light for visible light communication or positioning the mobile terminal 100 so that visible light communication light does not reach a visible light sensor (light-receiving sensor) of the mobile terminal 100).

The user interface module 120 may provide the user with a suggestion about an operation of positioning the mobile terminal 100 so that visible light reaches the mobile terminal 100 (or keeping the mobile terminal 100 in position so that visible light reaches the mobile terminal 100) when the "information for identifying the printer 150" is being received via visible light communication. This allows the user to readily understand what to do when the user is to receive information for identifying the printer 150 via visible light communication.

The file storage module 125 is connected to the communication control module 115 and the user interface module 120. The file storage module 125 stores a file to be printed. The communication control module 115 may create a print instruction that includes a file to be printed.

As in the example illustrated in FIG. 1, the printer 150 includes a visible light communication module 155, a communication module 160, a communication control module 165, a user interface module 170, a print control module 175, a file storage module 180, and a printing module 185. The printer 150 may be typically a printer or a device having a printer function, such as a multifunction device (an image processing device having two or more functions of a scanner, a printer, a copier, a facsimile machine, and similar devices).

The visible light communication module 155 is connected to the communication control module 165. The visible light communication module 155 performs visible light communication (receives, demodulates, modulates and emits light for visible light communication) with the mobile terminal 100. The visible light communication module 155 transmits information for identifying the printer 150 to establish communication with the printer 150 to the mobile terminal 100 via visible light communication.

The communication module 160 is connected to the communication control module 165. The communication module 160 performs communication (communication other than visible light communication) with the mobile terminal 100. The communication module 160 receives a print instruction from the mobile terminal 100 via the communication. The print instruction is passed to the communication control module 165.

The communication control module 165 is connected to the visible light communication module 155, the communication module 160, the user interface module 170, the print control module 175, and the file storage module 180. The communication control module 165 controls the visible light communication module 155 to transmit the "information for identifying the printer 150" to the mobile terminal 100 via visible light communication.

Further, the communication control module 165 receives a print instruction from the mobile terminal 100 via the communication module 160. In this case, upon receipt of a print instruction and the second information (information indicating that the information for identifying the printer 150, which has been transmitted by the communication control module 165 via visible light communication, has been received by the mobile terminal 100), the communication control module 165 controls the visible light communication module 155 to stop transmission via visible light communication. If a print instruction and the second information have not been received (that is, if a print instruction has been received but the second information has not been received), the communication control module 165 controls the visible light communication module 155 not to stop transmission via visible light communication. The second information is information for distinguishing acceptance of a print instruction through a visible light communication process from acceptance of a print instruction without using a visible light communication process.

The "second information" may be implemented using a flag. The flag is information generated by the mobile terminal 100 and indicating that the information for identifying the printer 150 has been received by the mobile terminal 100 via visible light communication. An example of using a flag will be described below with reference to an example illustrated in FIGS. 3 to 6. In the example in FIGS. 3 to 6, a "visible light communication flag" is illustrated as the flag by way of example.

Alternatively, the "second information" may be implemented using identification information that is generated by the printer 150 (information received by the mobile terminal 100 from the printer 150) and that is information for identifying visible light communication. An example of using identification information will be described below with reference to an example illustrated in FIGS. 16 to 19. In the example in FIGS. 16 to 19, "visible light communication number" is illustrated as identification information for identifying visible light communication, by way of example.

Further, the communication control module 165 controls the print control module 175 to perform printing in accordance with the print instruction.

Without control using the second information, upon receipt of a print instruction from a third party (a person who has obtained the information for identifying the printer 150 without using visible light communication) after instructions have been sent to the printer 150 to emit light, the printer 150 stops emitting light. Thus, a user who has sent instructions to the printer 150 to emit light is not able to receive the information for identifying the printer 150.

This exemplary embodiment allows the printer 150 to wait for a print instruction to be received from a user who has sent instructions to the printer 150 to emit light (allows the printer 150 to continue emitting light). Thus, the user is able to receive the information for identifying the printer 150 and to transmit a print instruction.

Further, the communication control module 165 may transmit the "information for identifying the printer 150" multiple times in order to reduce the potential risk of commencing reception via visible light communication without successful reception of the header portion of a print instruction. That is, in some cases, visible light communication might commence before the mobile terminal 100 is positioned so that visible light reaches the visible light sensor of the mobile terminal 100.

In a case where the printer 150 transmits the "information for identifying the printer 150" multiple times, the communication control module 115 of the mobile terminal 100 may determine whether or not the currently received information is identical to the previously received information and, if both pieces of information are identical, discard the currently received information.

The printer 150 may further include a human sensor that detects the presence of a person. The communication control module 165 may control the visible light communication module 155 to start visible light communication when the human sensor detects the presence of a person. The term "detect the presence of a person", as used here, is used to include detecting a person who is approaching the printer 150. Examples of the human sensor include an infrared sensor, an ultrasonic sensor, and a visible light sensor. A combination of them, for example, a combination of an infrared sensor and an ultrasonic sensor, may be used or an infrared sensor or the like alone may be used.

Alternatively, the printer 150 may include a camera. The camera can be used to detect the presence of a person or to recognize a human face to authenticate the identity of a person. The camera may be used to receive light for visible light communication. That is, the camera of the printer 150 may be used to realize reception of visible light communication light. This eliminates a need for a light-receiving unit for visible light communication separate from the camera, resulting in a reduction in cost.

The printer 150 may further include a liquid crystal display serving as a display unit for a user interface that emits light. The liquid crystal display may be used to emit light for visible light communication. That is, a display unit of the printer 150 may be used to emit light for visible light communication. This eliminates a need for a light-emitting unit for visible light communication separate from the liquid crystal display, resulting in a reduction in cost. It is to be understood that a display device other than a liquid crystal display (such as an organic electroluminescent (EL) display, a plasma display, cathode-ray tube (CRT), or a projector) may be used.

The printer 150 may further include an LED light (a type of imaging light source) that is used to capture images with a camera. The LED light can be used to capture an image of a person even in a dark setting to detect the presence of a person or to recognize a human face to authenticate the identity of a person. The LED light may be used to emit light for visible light communication. That is, an imaging light source of the printer 150 may be used to emit light for visible light communication. This eliminates a need for a light-emitting unit for visible light communication separate from the LED light, resulting in a reduction in cost.

The communication control module 165 may further control the visible light communication module 155 so that the printer 150 starts visible light communication upon receipt of an instruction for transmitting the information for identifying the printer 150 from the mobile terminal 100 via visible light communication.

The communication control module 165 may also control the visible light communication module 155 to stop emitting light for visible light communication when the communication module 160 receives a print instruction. The reason for this is to stop the "information for identifying the printer 150" from being excessively transmitted. The phrase "when the communication module 160 receives a print instruction", as used here, may be used to indicate when the reception of all pieces of data constituting a print instruction is completed or the time point at which a print instruction is determined to have been received.

The communication control module 165 may further control the visible light communication module 155 to transmit the characteristics or state of the printer 150 via visible light communication. Examples of the characteristics of the printer 150 include an available sheet size, the resolution, the availability of color or monochrome printing, and the availability of simplex or duplex printing. Examples of the state of the printer 150 include a printer-ready state, a printer-error state, and a paper-out state.

The user interface module 170 is connected to the communication control module 165 and the print control module 175. The user interface module 170 accepts a user operation made via a touch screen, audio, a line of sight, a gesture, a mouse, a keyboard, or the like. Further, the user interface module 170 informs the user of information by using a liquid crystal display, a speaker, a vibrator, or any other suitable device.

The print control module 175 is connected to the communication control module 165, the user interface module 170, the file storage module 180, and the printing module 185. The print control module 175 causes the printing module 185 to perform a printing process in accordance with the print instruction received by the communication control module 165.

The file storage module 180 is connected to the communication control module 165 and the print control module 175. The file storage module 180 stores a file included in the print instruction received by the communication control module 165.

In order to perform transmission via visible light communication, the user interface module 170 may provide the user with a suggestion about an operation of positioning the mobile terminal 100 so that visible light reaches the mobile terminal 100. This allows the user to readily understand what to do when the user is to perform transmission via visible light communication.

The printing module 185 is connected to the print control module 175. The printing module 185 performs a printing process in accordance with control of the print control module 175.

FIGS. 2A and 2B1 through 2B4 illustrate an example configuration of a system according to this exemplary embodiment.

As in the example illustrated in FIG. 2A, visible light communication is performed between the mobile terminal 100 and the printer 150. For example, the mobile terminal 100 receives visible light communication light from the printer 150 to receive "information for identifying the printer 150". The mobile terminal 100 then sets the "information for identifying the printer 150" to enable communication with the printer 150. As described above, the communication to be enabled here is communication other than visible light communication. The mobile terminal 100 transmits a print instruction to the printer 150 by using the communication. The printer 150 prints a file transmitted from the mobile terminal 100. The user extracts a printed sheet from the printer 150.

The printer 150 is provided with a visible light communication device in an area thereof to which an external device (e.g., the mobile terminal 100) is able to apply light. Examples of the area include a front surface portion and a top surface portion of the printer 150.

In the example illustrated in FIG. 2A, the mobile terminal 100 and the printer 150 are kept apart from each other. The mobile terminal 100 and the printer 150 may be placed close to each other if visible light communication is possible therebetween. For example, as illustrated in FIG. 2B1, a mobile terminal seat 220 for accommodating the mobile terminal 100 may be disposed in a top surface portion of the printer 150.

For example, as illustrated in FIG. 2B2, a visible light communication device 225 may be disposed on an upper side surface of the mobile terminal seat 220. Alternatively, a visible light communication device 230 may be disposed on a bottom surface of the mobile terminal seat 220. The visible light communication device 225 may be defined over the entirety of the upper side surface of the mobile terminal seat 220. The visible light communication device 230 may be defined over the entirety of the bottom surface of the mobile terminal seat 220. The visible light communication device 225 (the visible light communication device 230) may be defined on the upper side surface, the right side surface, the left side surface, the lower side surface, or the bottom surface, or may be defined over the entirety thereof. The visible light communication device 225 (the visible light communication device 230) may be defined so as to match the position of a visible light communication device of the mobile terminal 100.

Alternatively, the visible light communication device 225 (the visible light communication device 230) may be defined on the entirety (the upper side surface, the lower side surface, the right side surface, the left side surface, and the bottom surface) of the mobile terminal seat 220 in order to support the mobile terminal 100 regardless of how the mobile terminal 100 is placed or the type of the mobile terminal 100.

Figure 4:
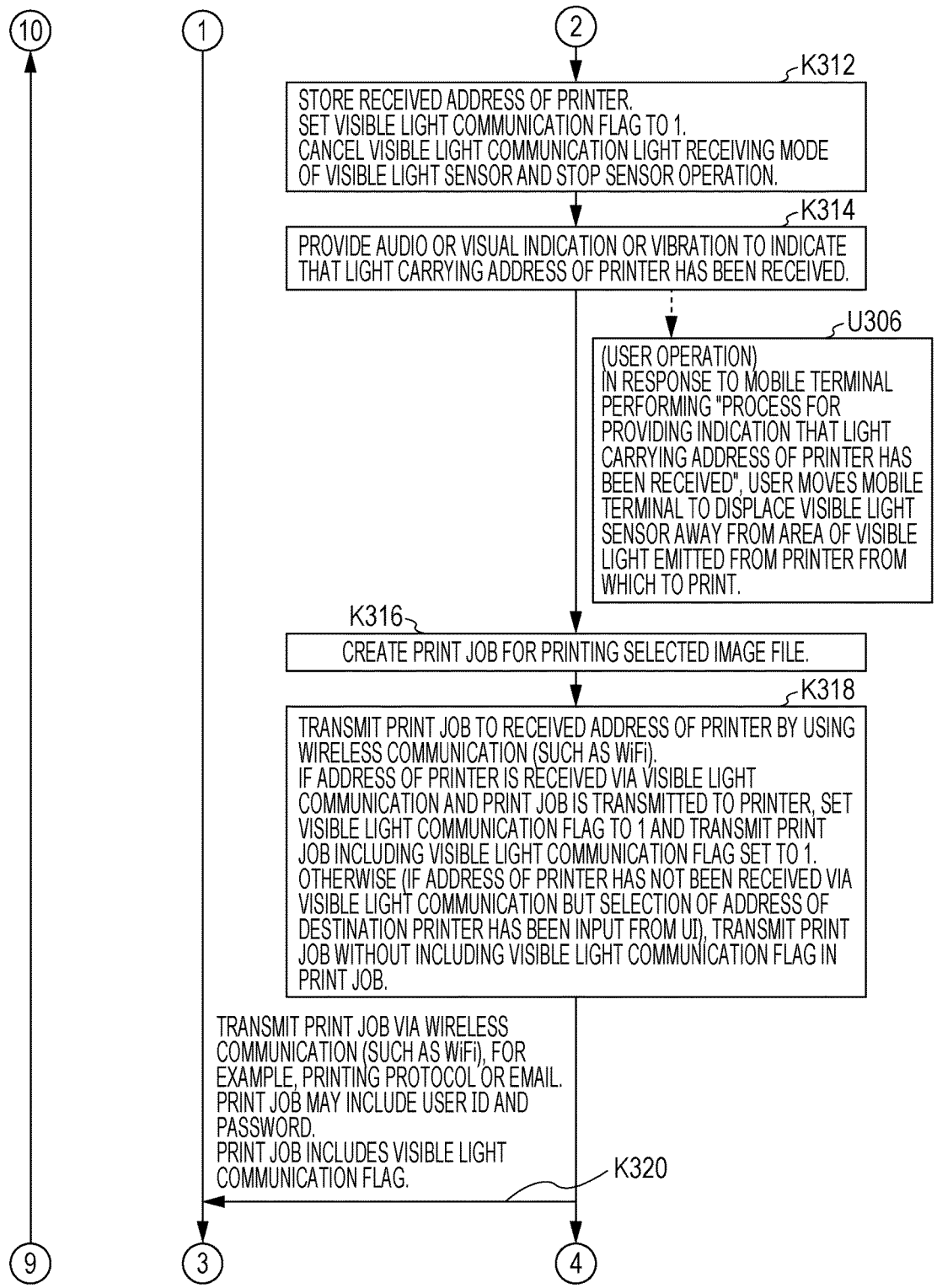
Figure 5:
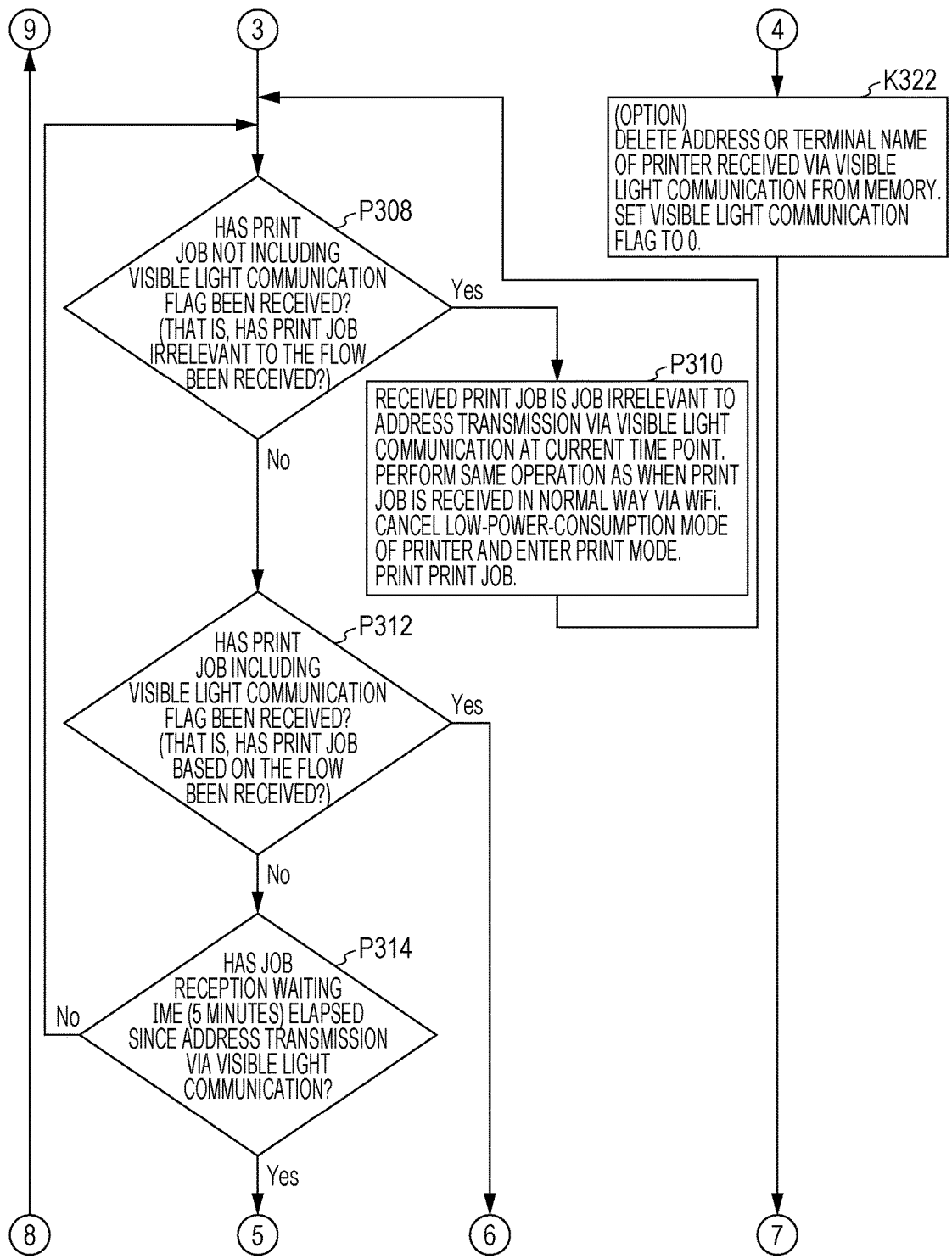
FIG. 5 is a flowchart illustrating the example process according to the exemplary embodiment.
Figure 6:
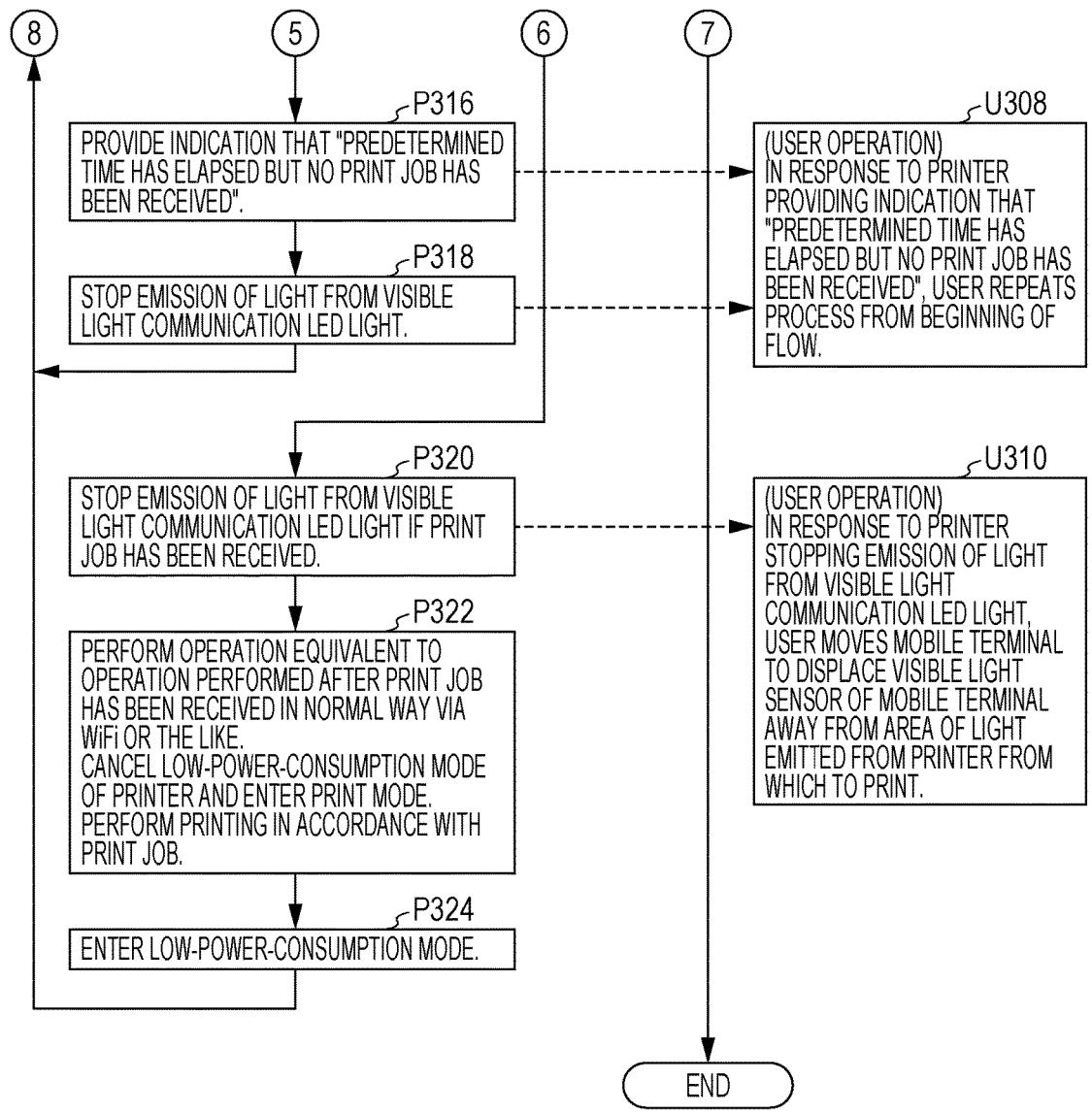
FIG. 6 is a flowchart illustrating the example process according to the exemplary embodiment.

As in the example illustrated in FIG. 2B3, the mobile terminal 100 may include a visible light communication device 250 on a side surface of the mobile terminal 100. Alternatively, as in the example illustrated in FIG. 2B4, the mobile terminal 100 may include a visible light communication device 255 near a camera 260. In this case, as described above, an image of an entity at the other end of the visible light communication (i.e., the printer 150) is captured with the camera 260 and is displayed on a display of the mobile terminal 100 to allow the user to check the entity at the other end of the communication. The camera 260 may have the function of the visible light communication device (a light-receiving sensor, a light-emitting device, or a combination of them) 255. In this case, it will be understood that the visible light communication device 255 in the example illustrated in FIG. 2B4 is not necessary and only the camera 260 is required. Additionally, a device disposed in the mobile terminal 100, such as a light-emitting device used as an imaging light source for capturing images with a camera (such as an LED light or a strobe light) or a display used for a user interface that emits light (such as a liquid crystal display), may be used as a light-emitting device for use in visible light communication.

A brief description is given of a process (1) that uses a visible light communication flag. The following description is intended to assist in understanding this exemplary embodiment, and a specific example is used for illustrative purposes only.

When an instruction for emitting light is made on the printer 150 in accordance with a user operation, the printer 150 transmits the address of the printer 150 via visible light communication. The mobile terminal 100 receives light for the visible light communication and transmits a print job to the address of the printer 150 via WiFi communication. The printer 150 receives and prints the print job, and stops light emission.

In this case, the mobile terminal 100 receives the address of the printer 150 via visible light communication. In order to transmit a print job to the printer 150, the mobile terminal 100 sets a visible light communication flag to "1", creates a print job including the visible light communication flag, and transmits the print job.

Otherwise (i.e., if the address of the printer 150 has not been received via visible light communication but the selection of the address of the destination printer 150 has been input to the mobile terminal 100 through a user interface), the mobile terminal 100 transmits a print job without including a visible light communication flag in the print job.

Then, the printer 150 waits to receive the visible light communication flag set to "1". During the waiting time, the printer 150 continues emitting light to transmit the address of the printer 150.

FIGS. 3 to 6 are a flowchart illustrating an example process according to this exemplary embodiment.

The printer 150 performs the following process. The operation of the user is also described in steps U.

In step P302, the printer 150 is in a low-power-consumption mode. The emission of light from an LED light of the printer 150 for visible light communication (hereinafter referred to as "visible light communication LED light of the printer 150") based on the visible light communication standard is being stopped.

In step U302, the user performs the following operation. The user presses a visible light communication start switch of the printer 150 or approaches the printer 150.

In step P304, when the visible light communication start switch of the printer 150 is pressed, the printer 150 enters a visible light emission mode and starts emission of light from the visible light communication LED light. The visible light includes the address or terminal name of the printer 150. An address or a terminal name is a piece of information indicating the destination of the communication via wireless communication (such as WiFi). In step P304, the LED light may be caused to emit light only when visible light communication is required (when the switch is pressed) to reduce power consumption.

In step P306, the printer 150 emits visible light including the address or terminal name of the printer 150 to communicate with the mobile terminal 100. The address or the terminal name is a piece of information indicating the destination of the communication via WiFi wireless communication. Examples of the information include an IP address, an email address, and a terminal name.

In step P308, the printer 150 determines whether or not a print job not including a visible light communication flag (that is, a print job irrelevant to this flow) has been received. If such a print job has been received, the process proceeds to step P310. Otherwise, the process proceeds to step P312. In the processing of step P308, the printer 150 may determine whether or not a print job not including a visible light communication flag set to "1" has been received. If such a print job has been received, the process may proceed to step P310, whereas, otherwise, the process may proceed to step P312. The phrase "such a print job has been received" is used to indicate that a print job including no visible light communication flag has been received or that a print job including a visible light communication flag set to "0" has been received.

In step P310, since the print job received in step K320 is a job irrelevant to address transmission via visible light communication at the current time point, the printer 150 performs the same or substantially the same operation as when the print job is received in a normal way via WiFi. The printer 150 cancels its low-power-consumption mode and enters a print mode. Then, the printer 150 performs a printing operation in accordance with the print job. The process then returns to step P308, and the printer 150 waits for a print job to be received in step K320. It is to be understood that the visible light communication LED light continues emitting light (the emission of light from the visible light communication LED light is not stopped).

In step P312, the printer 150 determines whether or not a print job including a visible light communication flag (that is, a print job based on this flow) has been received. If such a print job has been received, the process proceeds to step P320. Otherwise, the process proceeds to step P314. In the processing of step P312, the printer 150 may determine whether or not a print job including a visible light communication flag set to "1" has been received. If such a print job has been received, the process may proceed to step P320, whereas, otherwise, the process may proceed to step P314.

In step P314, the printer 150 determines whether or not a job reception waiting time (e.g., five minutes) has elapsed since address transmission via visible light communication. If the job reception waiting time has elapsed, the process proceeds to step P316. Otherwise, the process returns to step P308.

In the flow in which no visible light communication flag is used (a flow that branches on the basis of determination only as to whether or not a print job has been received), when the mobile terminal 100 receives a print job irrelevant to a visible light communication flow (for example, the print job from a third party, described above) via WiFi before the mobile terminal 100 completes the reception of the address via visible light communication, then, in step P320, the printer 150 stops light emission and terminates this flow. Thus, the user has to restart this flow.

In the flow in which a visible light communication flag is used (this process), the process does not end even if an irrelevant print job is received. The printer 150 waits to receive a print job including a visible light communication flag. Specifically, if YES is obtained in step P308, the process proceeds to step P310 and then returns to step P308. Accordingly, an operation expected by the user is performed.

In step P316, the printer 150 provides an indication that "the predetermined time has elapsed but no print job has been received".

In step P318, the printer 150 stops emission of light from the visible light communication LED light. Then, the process returns to step P302.

In step U308, the user performs the following operation. When the printer 150 provides an indication that "the predetermined time has elapsed but no print job has been received" (step P316 or step P318), the user repeats the process from the beginning of the flow (e.g., step P302).

In step P320, if the print job has been received, the printer 150 stops emission of light from the visible light communication LED light. If the print job has been received, there is no longer a need to emit light. Thus, light emission stops to reduce power consumption. In addition, by stopping light emission, the user of the mobile terminal 100 is notified that the printer 150 has received a print job. This allows the user to understand that the user may be able to displace the visible light sensor away from the area of visible light emitted from the printer 150 from which to print even if the mobile terminal 100 does not "provide an audio or visual indication or vibrate to indicate that light carrying the address of the printer 150 has been received". The completion of reception of a print job may be displayed on a console panel different from that for the visible light communication LED light of the printer 150. However, the visible light communication LED light is caused to stop emitting light, which would be visually more recognizable to the user and eliminate the need to display information on the console panel. Also in step P318, "light emission is stopped". Whereas, in step P318, light emission is stopped "after a predetermined time has elapsed", in step P320, light emission is stopped "before a predetermined time has elapsed" (typically, immediately after an address or the like has been transmitted), which is also distinguishable to the user.

In step U310, the user performs the following operation. When the printer 150 stops emitting light from the visible light communication LED light, the user moves the mobile terminal 100 to displace the visible light sensor of the mobile terminal 100 away from the area of light emitted from the printer 150 from which to print.

In step P322, the operation performed by the printer 150 after the print job has been received via WiFi or the like is equivalent to an operation performed when a print job has been received in a normal way via WiFi. The printer 150 cancels its low-power-consumption mode and enters a print mode. Then, the printer 150 performs a printing operation in accordance with the print job.

In step P324, the printer 150 enters the low-power-consumption mode after the printing operation. Then, the process returns to step P302.

On the other hand, the mobile terminal 100 performs the following process.

In step K302, an image file icon is selected by the user. No input is made for the selection of a printer.

In step K304, the mobile terminal 100 determines whether or not a "Start reception of address via visible light communication" icon has been clicked on. If the "Start reception of address via visible light communication" icon has been clicked on, the process proceeds to step K306. Otherwise, the mobile terminal 100 is placed on standby until the "Start reception of address via visible light communication" icon has been clicked on.

In step K306, the mobile terminal 100 brings the visible light sensor into a visible light communication receiving mode. The mobile terminal 100 starts receiving visible light based on the visible light communication standard.

In step U304, the user performs the following operation. The user positions the mobile terminal 100 so that the visible light sensor of the mobile terminal 100 is exposed to visible light emitted from the printer 150 from which to print.

In step K308, the mobile terminal 100 determines whether or not the visible light sensor has received visible light based on the visible light communication standard. If the visible light has been received, the process proceeds to step K310. Otherwise, the mobile terminal 100 waits to receive visible light.

In step K310, the mobile terminal 100 determines whether or not the received visible light includes the address of the printer 150. If the address of the printer 150 is included, the process proceeds to step K312. Otherwise, the process returns to step K308.

In step K312, the mobile terminal 100 stores the received address of the printer 150. Then, the mobile terminal 100 sets the visible light communication flag to "1". Then, the mobile terminal 100 cancels the visible light communication receiving mode of the visible light sensor and stops the operation of the visible light sensor.

The visible light communication flag has value "0" or "1". The visible light communication flag is set to "1" when a printer address is received via visible light communication and a print job is transmitted to the printer 150 identified by the address.

Otherwise (i.e., if the address of the printer 150 has not been received via visible light communication but the selection of the address of the destination printer 150 has been input through a user interface), the visible light communication flag is set to "0".

The visible light communication flag is set to "0" (initial value) when power is turned on (or when the process in the illustrated flowchart is started). If the address of the printer 150 has been received via visible light communication, the mobile terminal 100 sets the visible light communication flag to "1". Thereafter, upon transmitting the print job (or upon confirming the completion of the print job), the mobile terminal 100 sets the visible light communication flag to "0".

In step K314, the mobile terminal 100 provides an audio or visual indication, a vibration, or the like to indicate that light carrying the address of the printer 150 has been received.

In step U306, when the mobile terminal 100 performs a "process for providing an indication that light carrying the address of the printer 150 has been received", the user performs the following operation. The user moves the mobile terminal 100 to displace the visible light sensor of the mobile terminal 100 away from the area of visible light emitted from the printer 150 from which to print.

The operation of step K314 is optional. The operation of step K314 allows the user to be informed of the completion of the reception of light carrying the address of the printer 150. The user is then able to know when to displace the mobile terminal 100 away from the area of visible light emitted from the printer 150.

In step K316, the mobile terminal 100 creates a print job for printing the image file selected by the user.

In step K318, the mobile terminal 100 transmits the print job to the received address of the printer 150 by using wireless communication (such as WiFi). The print job may be transmitted by using communication other than WiFi. For example, Bluetooth may be used.

When receiving the address of the printer 150 via visible light communication and transmitting a print job to the printer 150, the mobile terminal 100 sets the visible light communication flag to "1", creates a print job including the visible light communication flag, and transmits the print job. Otherwise (i.e., if the address of the printer 150 has not been received via visible light communication but the selection of the address of the destination printer 150 has been input through a user interface), the mobile terminal 100 transmits a print job without including a visible light communication flag in the print job. Alternatively, the mobile terminal 100 may create a print job including a visible light communication flag set to "0" and transmit the print job.

In step K320, the print job is transmitted from the mobile terminal 100 to the printer 150. Here, the print job is transmitted via wireless communication (such as WiFi). For example, a printing protocol or email may be used. The print job may also include additional information, namely, a user ID and a password. The print job includes a visible light communication flag set to "1".

In step K322, the mobile terminal 100 deletes the address or terminal name of the printer 150, which is received via visible light communication, from a memory. The visible light communication flag is set to "0". Step K322 is optional.

Without this exemplary embodiment (with the use of communication based only on WiFi as in the related art), it is necessary to set the address of the printer 150, which is the destination of the print job, in the mobile terminal 100 in advance. This setting operation may be difficult for a user to perform in some cases. For this reason, the address of the printer 150, which is once set, is stored in a non-volatile memory and is re-used for the next transmission of a print job.

This exemplary embodiment may facilitate the reception of the address of the destination printer 150 via visible light communication. This may eliminate the need to store the received address of the printer 150, which is once received, and re-use it. The deletion of the address of the printer 150 may prevent an unwanted printer name from being stored in a printer selection list in the mobile terminal 100, making the printer selection list easier to see to the user, as well as preventing leakage of information related to the printer 150 (leading to improved security).

Figure 7:
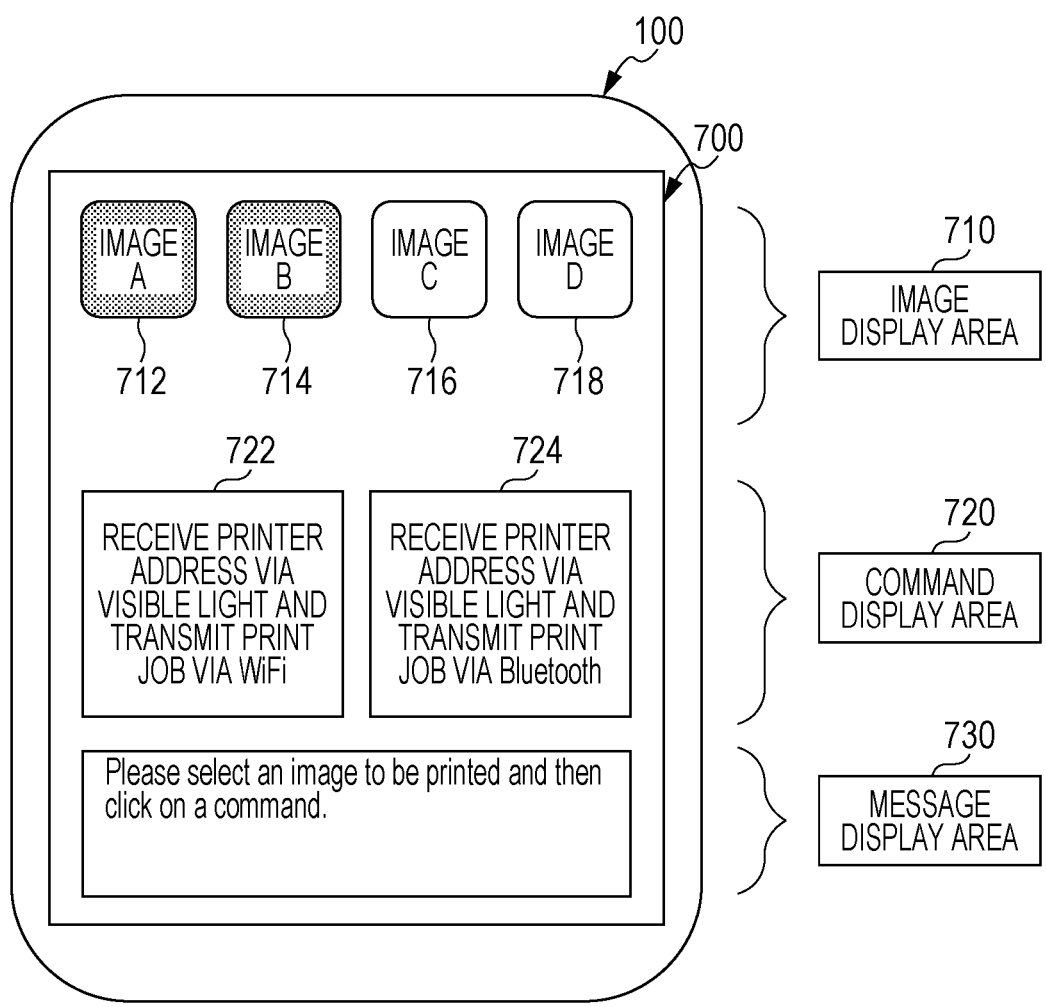
FIG. 7 illustrates an example process according to the exemplary embodiment.

FIG. 7 illustrates an example process (by the mobile terminal 100) according to this exemplary embodiment. Specifically, there is illustrated an example display corresponding to step K302 and step K304 in the flowchart. In the illustrated example, the camera of the mobile terminal 100 is used as a light-receiving unit to realize reception of visible light communication.

The mobile terminal 100 includes a display 700. In FIG. 7, the content displayed on the display 700 is illustrated by way of example.

The display 700 has three areas: an image display area 710, a command display area 720, and a message display area 730.

The image display area 710 shows an "image A" icon 712, an "image B" icon 714, an "image C" icon 716, and an "image D" icon 718.

The command display area 720 shows a "Receive printer address via visible light and transmit print job via WiFi" icon 722 and a "Receive printer address via visible light and transmit print job via Bluetooth" icon 724.

The message display area 730 shows a message. For example, the message "Please select an image to be printed and then click on a command" is displayed in the message display area 730.

The example in FIG. 7 demonstrates that the "image A" icon 712 and the "image B" icon 714 have been selected. Thereafter, in response to a click on the "Receive printer address via visible light and transmit print job via WiFi" icon 722 or the "Receive printer address via visible light and transmit print job via Bluetooth" icon 724, a transition to "YES" in step K304 in the flowchart occurs.

Figure 8:
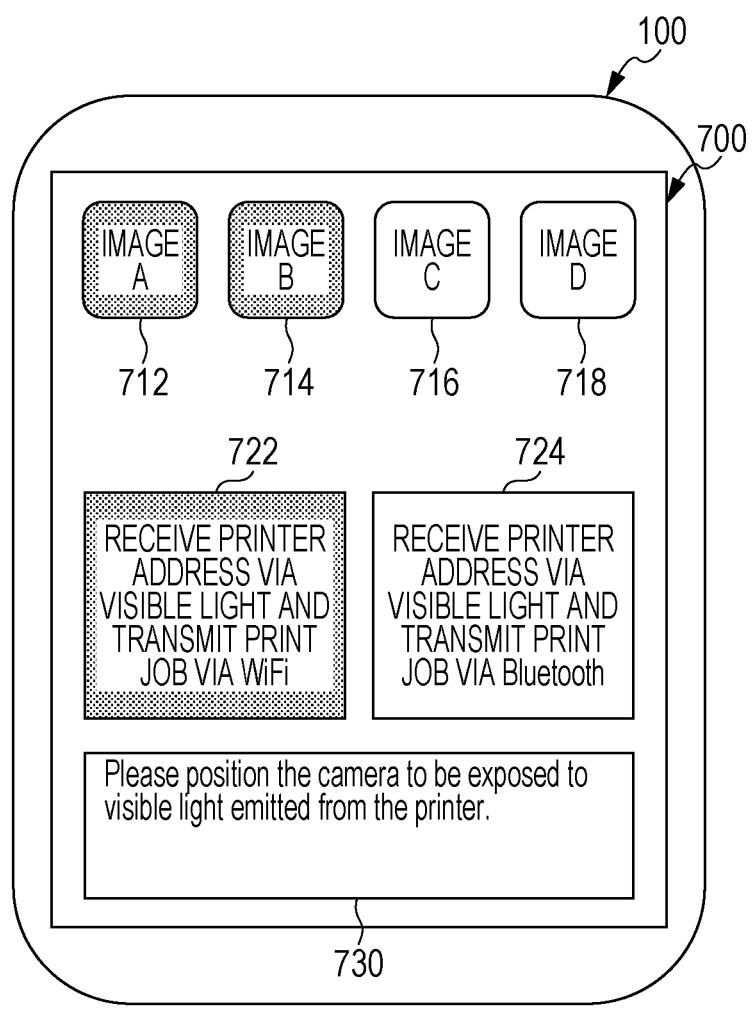
FIG. 8 illustrates an example process according to the exemplary embodiment.

FIG. 8 illustrates an example process (by the mobile terminal 100) according to this exemplary embodiment. Specifically, there is illustrated an example display corresponding to step K306 and step U304 in the flowchart.

The "Receive printer address via visible light and transmit print job via WiFi" icon 722 is being selected by the user.

The message display area 730 shows, for example, the message "Please position the camera to be exposed to visible light emitted from the printer". Here, the "camera" is a camera (light-receiving unit) included in the mobile terminal 100. The display of this message allows the user to readily understand what to do. The term "camera" is used here to indicate a visible light sensor. The user performs an operation of positioning the mobile terminal 100 so that the visible light sensor of the mobile terminal 100 is exposed to visible light emitted from the printer 150 from which to print.

Figure 9:
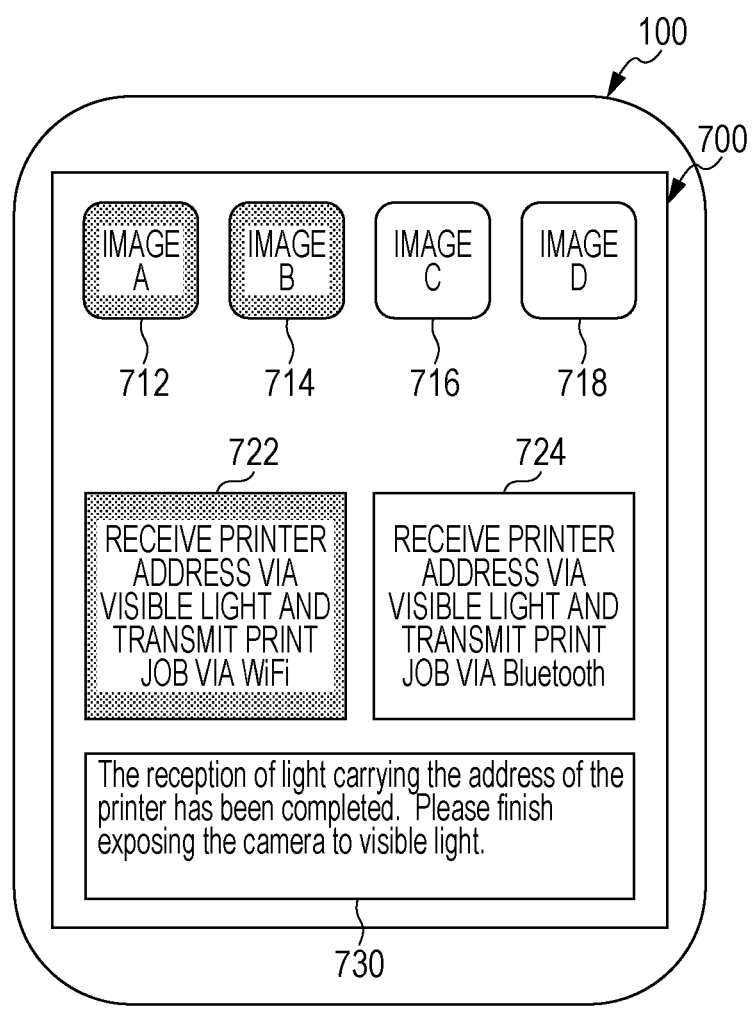
FIG. 9 illustrates an example process according to the exemplary embodiment.

FIG. 9 illustrates an example process (by the mobile terminal 100) according to this exemplary embodiment. Specifically, there is illustrated an example display corresponding to steps K308 to K314 and step U306 in the flowchart.

The "Receive printer address via visible light and transmit print job via WiFi" icon 722 is being selected by the user.

The message display area 730 shows, for example, the message "The reception of light carrying the address of the printer has been completed. Please finish exposing the camera to visible light". The "camera" is used here to indicate a visible light sensor.

When the reception of light carrying the address of the printer 150 has been completed, the operation to be performed by the user is displayed in the message display area 730. This display allows the user to readily understand what to do.

Figure 10:
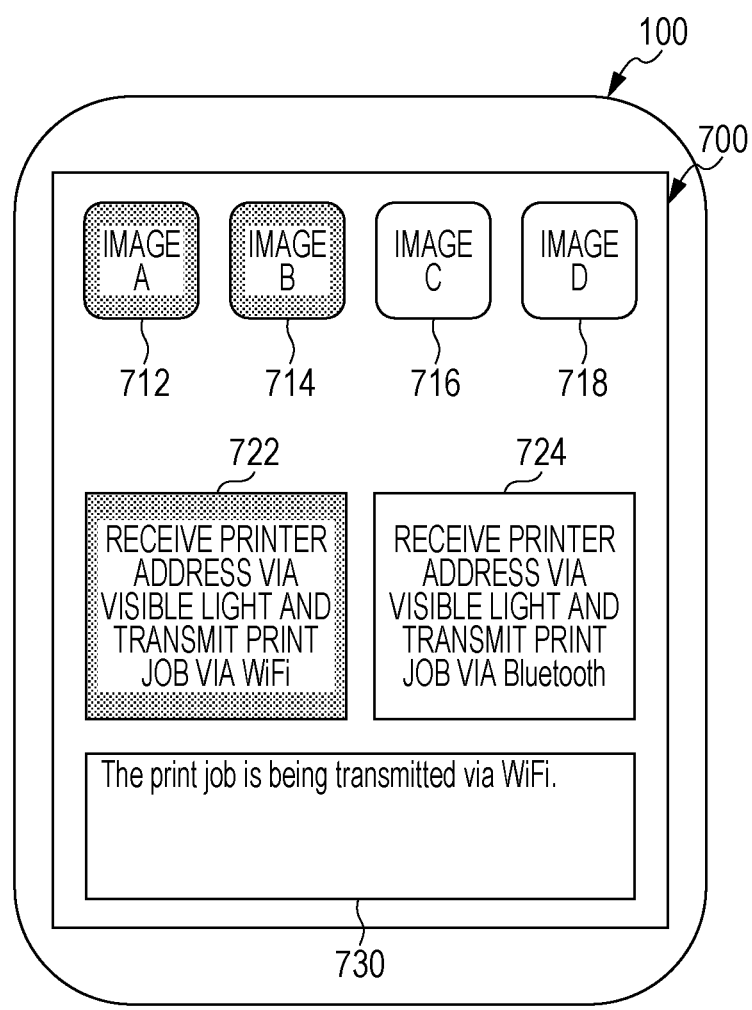
FIG. 10 illustrates an example process according to the exemplary embodiment.

FIG. 10 illustrates an example process (by the mobile terminal 100) according to this exemplary embodiment. Specifically, there is illustrated an example display corresponding to step K316 and step K318 in the flowchart.

The "Receive printer address via visible light and transmit print job via WiFi" icon 722 is being selected by the user.

The message display area 730 shows, for example, the message "The print job is being transmitted via WiFi".

In the steps described above, the mobile terminal 100 transmits the print job to the received address of the printer 150 by using wireless communication (such as WiFi). When the "Receive printer address via visible light and transmit print job via Bluetooth" icon 724 is selected, the message "The print job is being transmitted via Bluetooth" is displayed.

Figure 11:
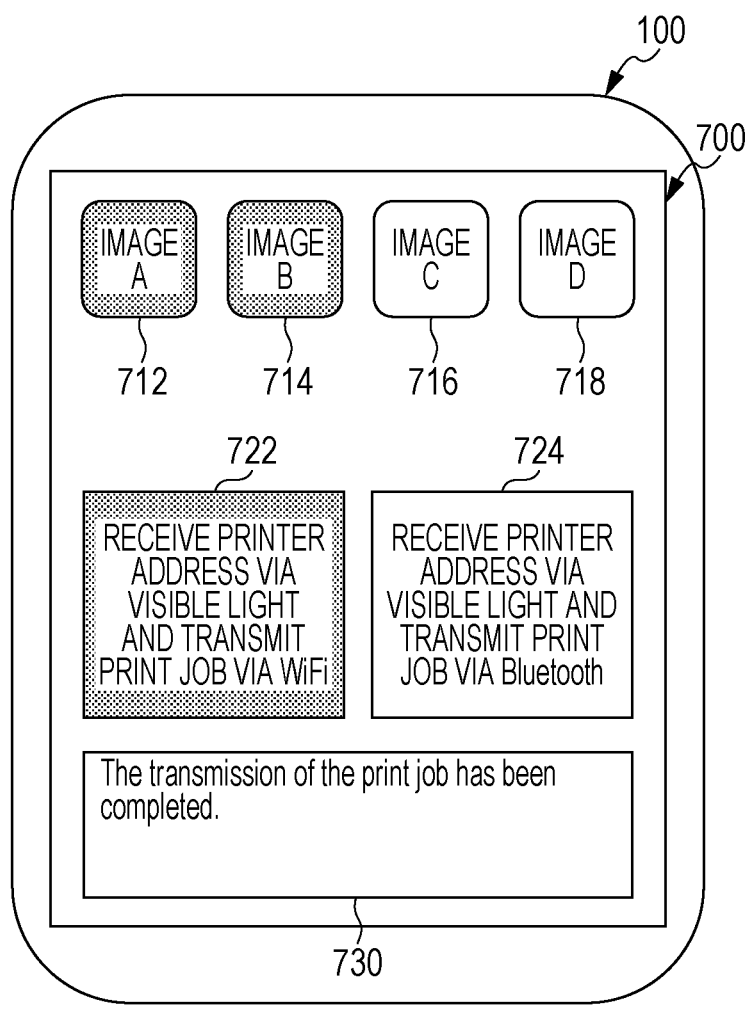
FIG. 11 illustrates an example process according to the exemplary embodiment.

FIG. 11 illustrates an example process (by the mobile terminal 100) according to this exemplary embodiment. Specifically, there is illustrated an example display corresponding to step K322 in the flowchart.

The "Receive printer address via visible light and transmit print job via WiFi" icon 722 is being selected by the user.

The message display area 730 shows, for example, the message "The transmission of the print job has been completed". The user only waits for the print job to be printed from the printer 150.

Figure 12:
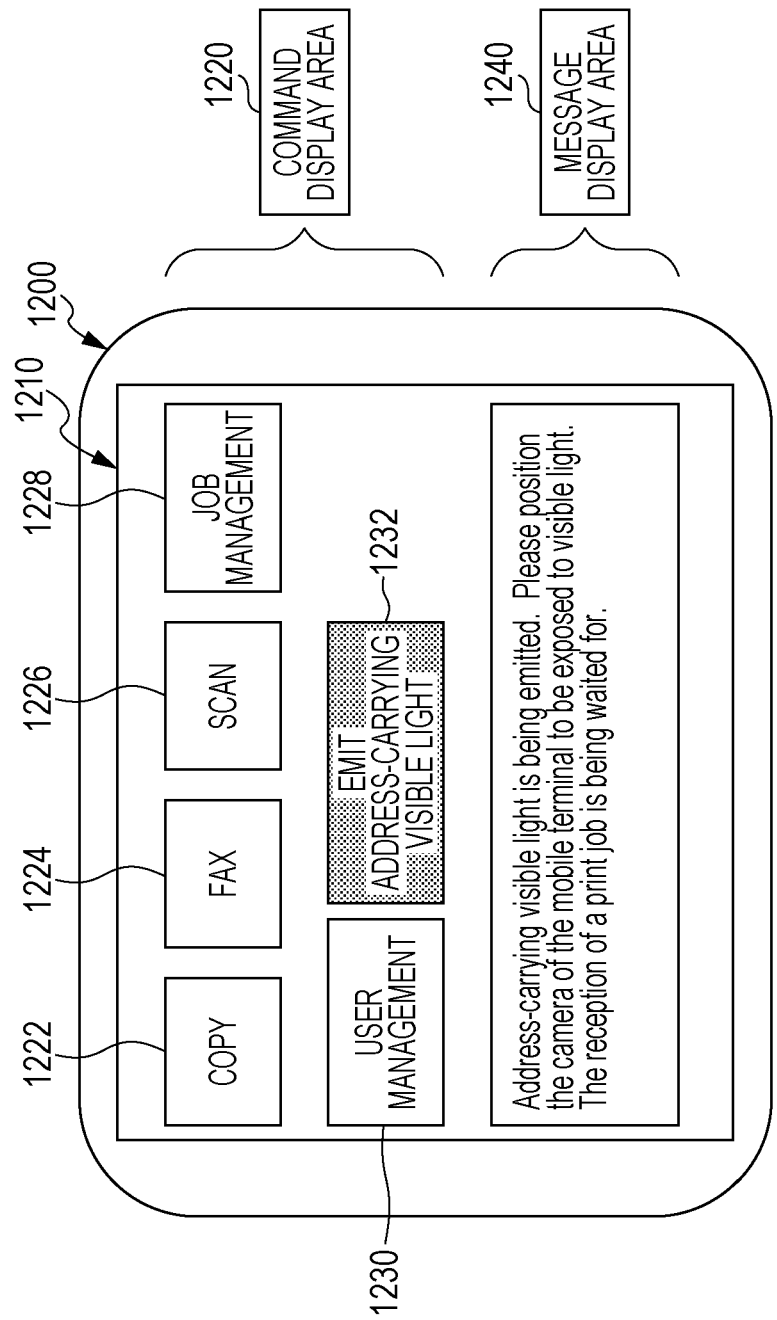
FIG. 12 illustrates an example process according to the exemplary embodiment.

FIG. 12 illustrates an example process (by the printer 150) according to this exemplary embodiment. Specifically, there is illustrated an example display corresponding to step U302 and step P304 in the flowchart.

A display device 1200 includes a display 1210.

The display 1210 has a command display area 1220 and a message display area 1240.

The command display area 1220 shows "copy" icon 1222, a "fax" icon 1224, a "scan" icon 1226, a "job management" icon 1228, a "user management" icon 1230, and an "Emit address-carrying visible light" icon 1232.

The message display area 1240 shows a message.

The "Emit address-carrying visible light" icon 1232 is being selected by the user.

The message display area 1240 shows, for example, the message "Address-carrying visible light is being emitted. Please position the camera of the mobile terminal to be exposed to visible light. The reception of a print job is being waited for".

In FIG. 12, a screen obtained after a visible light communication start icon (corresponding to the "Emit address-carrying visible light" icon 1232) on the printer 150 has been selected is illustrated by way of example.

In the example in FIG. 12, the printer 150 is emitting light based on the visible light communication standard. The operation to be performed by the user is displayed in the message display area 1240. This display allows the user to readily understand what to do.

Figure 13:
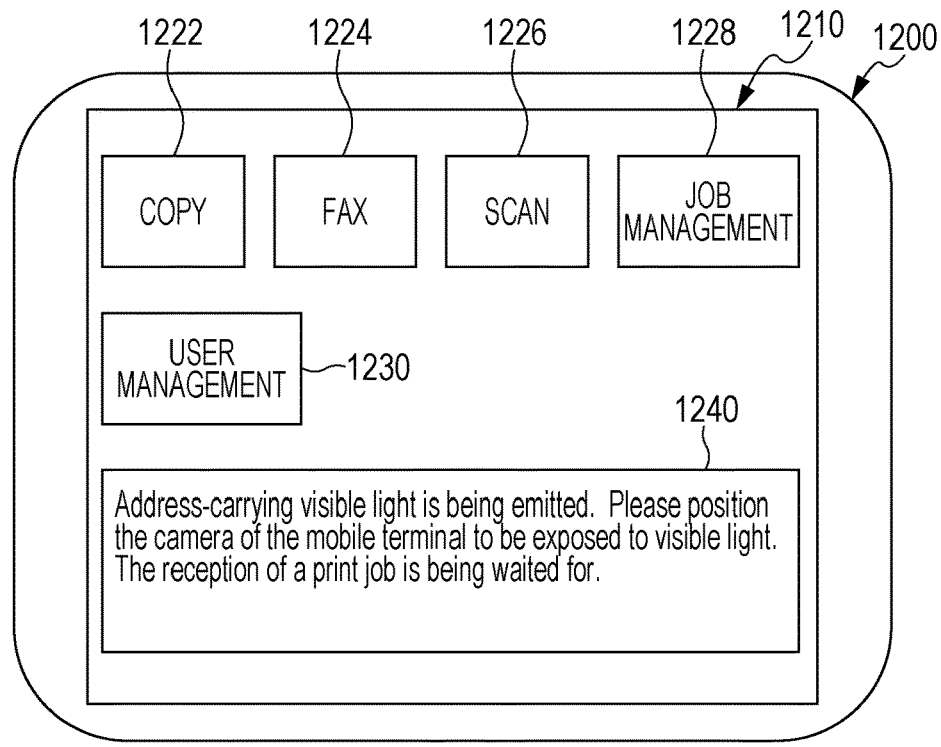
FIG. 13 illustrates an example process according to the exemplary embodiment.

FIG. 13 illustrates an example process (by the printer 150) according to this exemplary embodiment. Specifically, there is illustrated an example display corresponding to step U302 and step P304 (step P2004 and step P2104, described below with reference to an example illustrated in FIG. 20 and FIG. 21, respectively). That is, there is illustrated an example display in the following situation: when a person who is approaching the printer 150 is detected in the situation where the "Emit address-carrying visible light" icon 1232 is not being displayed, the mobile terminal 100 emits light including an instruction for emitting address-carrying light and the printer 150 receives the light.

The command display area 1220 shows the "copy" icon 1222, the "fax" icon 1224, the "scan" icon 1226, the "job management" icon 1228, and the "user management" icon 1230.

The message display area 1240 shows, for example, the message "Address-carrying visible light is being emitted. Please position the camera of the mobile terminal to be exposed to visible light. The reception of a print job is being waited for".

The "Emit address-carrying visible light" icon 1232 is not displayed when there is no need to provide instructions to the printer 150 to start visible light communication or when the printer 150 constantly emits light. When the printer 150 is emitting light based on the visible light communication standard, the operation to be performed by the user is displayed in the message display area 1240. This display allows the user to readily understand what to do.

Figure 14:
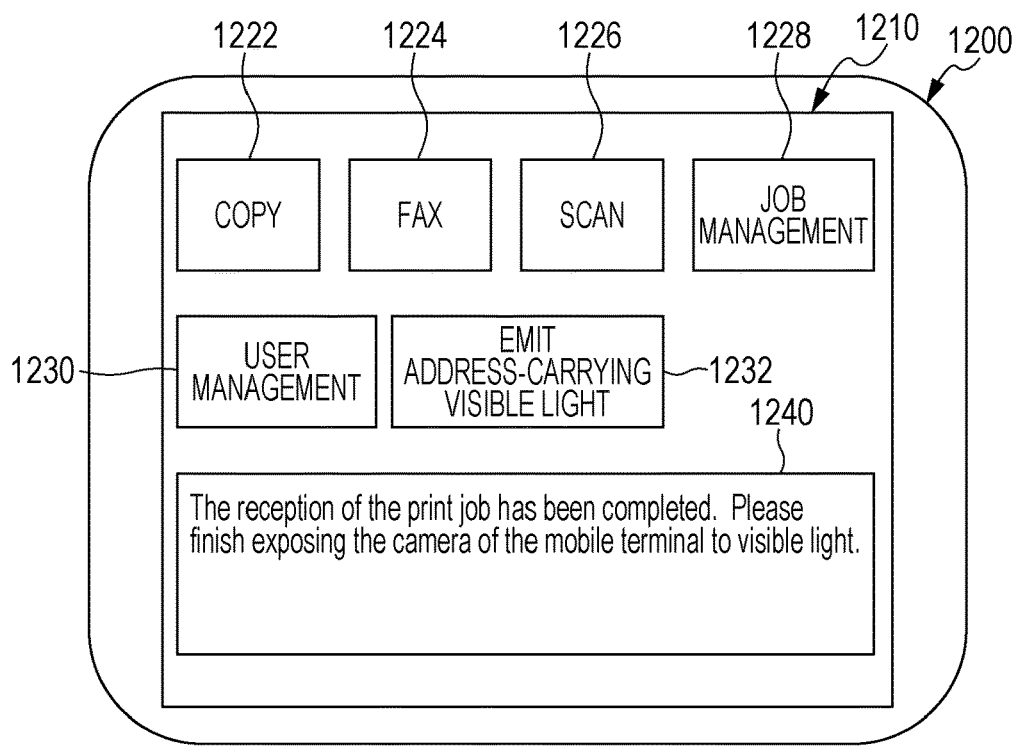
FIG. 14 illustrates an example process according to the exemplary embodiment.

FIG. 14 illustrates an example process (by the printer 150) according to this exemplary embodiment. Specifically, there is illustrated an example display corresponding to step P320 in the flowchart.

The message display area 1240 shows, for example, the message "The reception of the print job has been completed. Please finish exposing the camera of the mobile terminal to visible light".

When the reception of the print job is completed, the printer 150 stops emission of light from the visible light communication LED light.

If the "Emit address-carrying visible light" icon 1232 is being displayed, the state of the "Emit address-carrying visible light" icon 1232 is changed from the selected state to the original state (i.e., the unselected state).

The operation to be performed by the user is displayed in the message display area 1240. This display allows the user to readily understand what to do.

Figure 15:
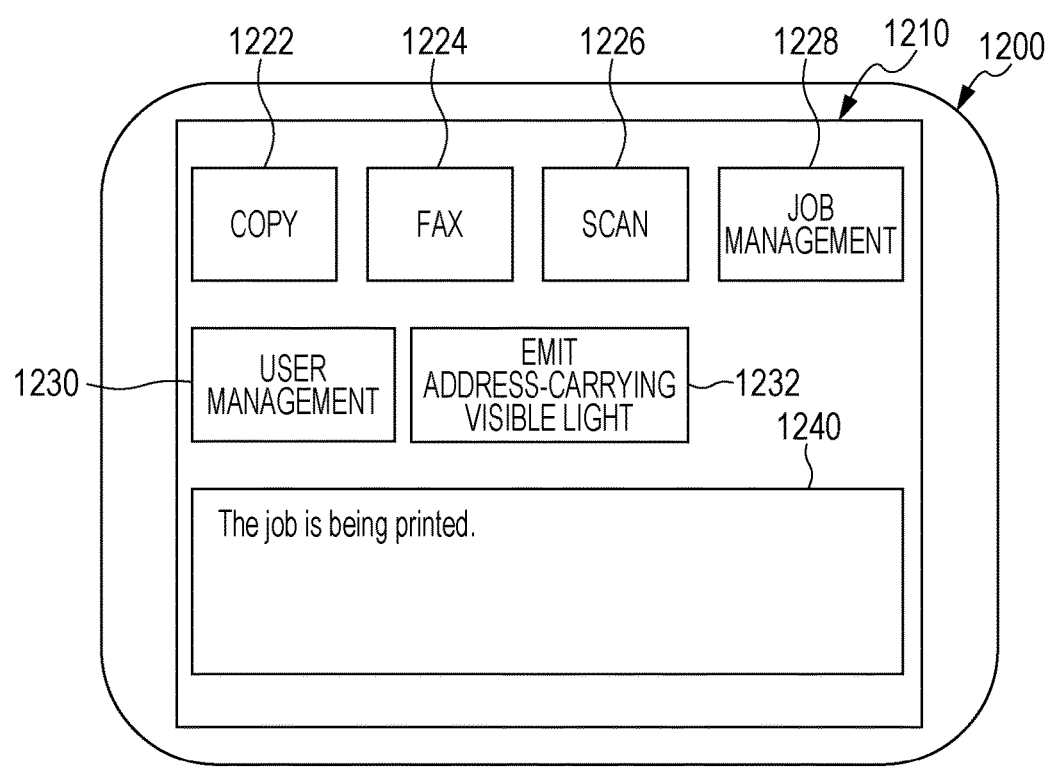
FIG. 15 illustrates an example process according to the exemplary embodiment.

FIG. 15 illustrates an example process (by the printer 150) according to this exemplary embodiment. Specifically, there is illustrated an example display corresponding to step P322 in the flowchart.

The message display area 1240 shows, for example, the message "The job is being printed". This message indicates that printing is in progress in accordance with the print job. When the printing of the print job is completed, the message "The printing of the job has been completed" is displayed.

A brief description is given of a process (2) that uses a visible light communication number. The following description is intended to assist in understanding this exemplary embodiment, and a specific example is used for illustrative purposes only.

When an instruction for emitting light is made on the printer 150 in accordance with a user operation, the printer 150 transmits the address of the printer 150 via visible light communication. The mobile terminal 100 receives the visible light communication and transmits a print job to the address of the printer 150 via WiFi communication. The printer 150 receives and prints the print job and then stops light emission.

In this case, the printer 150 transmits the address of the printer 150 and a visible light communication number via visible light communication.

Upon receipt of the address of the printer 150 and the visible light communication number via visible light communication, the mobile terminal 100 transmits a print job including the visible light communication number to the received address of the printer 150.

The printer 150 waits to receive a print job including the current visible light communication number. During the waiting time, the printer 150 continues emitting light to transmit the address of the printer 150.

FIGS. 16 to 19 are another flowchart illustrating an example process according to this exemplary embodiment.

The printer 150 performs the following process. The operation of the user is also described in steps U.

In step P1602, the printer 150 is in a low-power-consumption mode. The emission of light from the visible light communication LED light of the printer 150 based on the visible light communication standard is being stopped.

In step U1602, the user performs the following operation. The user presses a visible light communication start switch of the printer 150 or approaches the printer 150.

In step P1604, when the visible light communication start switch of the printer 150 is pressed, the printer 150 enters a visible light emission mode and starts emission of light from the visible light communication LED light. The visible light includes the address or terminal name of the printer 150. An address or a terminal name is a piece of information indicating the destination of the communication via wireless communication (such as WiFi). In step P1604, the LED light may be caused to emit light only when visible light communication is required (when the switch is pressed) to reduce power consumption.

In step P1605, the printer 150 sets the value of a visible light communication number. The term "visible light communication number", as used here, refers to a number indicating, for example, how many times address transmission has been performed via visible light communication prior to the current address transmission via visible light communication since power to the printer 150 was turned on. The visible light communication number is set to "0" or "1" at the time of shipment of the printer 150. Each time address transmission via visible light communication commences in response to pressing of the visible light communication start switch, the visible light communication number is incremented by "1". The numbers themselves have no meaning. It is only required to distinguish the current visible light communication from the previous visible light communication. As an alternative to the consecutive values, for example, non-overlapping random numbers, date and time numbers (year, month, day, hour, minute, second, and fraction of second, or a combination of any of them), hash values for the date and time numbers, or the like may be used.

In step P1606, the printer 150 emits visible light including the address or terminal name of the printer 150 to communicate with the mobile terminal 100. The address or the terminal name is a piece of information indicating the destination of the communication via WiFi wireless communication. Examples of the information include an IP address, an email address, and a terminal name. The printer 150 also transmits a visible light communication number.

In step P1608, it is determined whether or not any of the following conditions hold (that is, a print job irrelevant to this flow).

(1) A print job not including a visible light communication number has been received.

(2) A print job including a visible light communication number has been received but the received visible light communication number is different from the visible light communication number obtained at the current time point.

If any of the (1) and (2) conditions described above is met, the process proceeds to step P1610. Otherwise, the process proceeds to step P1612.

In step P1610, the received print job is a job irrelevant to address transmission via visible light communication at the current time point. Thus, the printer 150 performs the same or substantially the same operation as when the print job is received in a normal way via WiFi. The printer 150 cancels its low-power-consumption mode and enters a print mode. Then, the printer 150 performs a printing operation in accordance with the print job. The process then returns to step P1608, and the printer 150 waits for a print job to be received in step K1620. It is to be understood that the visible light communication LED light continues emitting light (the emission of light from the visible light communication LED light is not stopped).

In step P1612, the printer 150 determines whether or not a print job including a visible light communication number has been received and the received visible light communication number is the same as the visible light communication number obtained at the current time point (that is, a print job based on this flow). If this condition is met, the process proceeds to step P1620. Otherwise, the process proceeds to step P1614.

In step P1614, the printer 150 determines whether or not a job reception waiting time (e.g., five minutes) has elapsed since address transmission via visible light communication. If the job reception waiting time has elapsed, the process proceeds to step P1616. Otherwise, the process returns to step P1608.

In addition to the advantages of the flow illustrated in FIGS. 3 to 6 in which a visible light communication flag is used, the following advantages are additionally achievable.

The use of a visible light communication number allows continuation of light emission for visible light communication without terminating the flow even if a print job is received from a user who has previously sent instructions to the printer 150 to transmit the address of the printer 150. It is possible to wait for a print job to be received from a user who has sent instructions to the current printer 150 to transmit the address of the printer 150. Accordingly, an operation expected by the user is performed.

In step P1616, the printer 150 provides an indication that "the predetermined time has elapsed but no print job has been received".

In step P1618, the printer 150 stops emission of light from the visible light communication LED light. Then, the process returns to step P1602.

In step U1608, the user performs the following operation. When the printer 150 provides an indication that "the predetermined time has elapsed but no print job has been received" (step P1616 or step P1618), the user repeats the process from the beginning of the flow (e.g., step P1602).

In step P1620, if the print job has been received, the printer 150 stops emission of light from the visible light communication LED light. If the print job has been received, there is no longer a need to emit light. Thus, light emission stops to reduce power consumption. In addition, by stopping light emission, the user of the mobile terminal 100 is notified that the printer 150 has received a print job. This allows the user to understand that the user may be able to displace the visible light sensor away from the area of visible light emitted from the printer 150 from which to print even if the mobile terminal 100 does not "provide an audio or visual indication or vibrate to indicate that light carrying the address of the printer 150 has been received". The completion of reception of a print job may be displayed on a console panel different from that for the visible light communication LED light of the printer 150. However, the visible light communication LED light is caused to stop emitting light, which would be visually more recognizable to the user and eliminate the need to display information on the console panel. Also in step P1618, "light emission is stopped". Whereas, in step P1618, light emission is stopped "after a predetermined time has elapsed", in step P1620, light emission is stopped "before a predetermined time has elapsed" (typically, immediately after an address or the like has been transmitted), which is also distinguishable to the user.

In step U1610, the user performs the following operation. When the printer 150 stops emitting light from the visible light communication LED light, the user moves the mobile terminal 100 to displace the visible light sensor of the mobile terminal 100 away from the area of light emitted from the printer 150 from which to print.

In step P1622, the operation performed by the printer 150 after the print job has been received via WiFi or the like is equivalent to an operation performed when a print job has been received in a normal way via WiFi. The printer 150 cancels its low-power-consumption mode and enters a print mode. Then, the printer 150 performs a printing operation in accordance with the print job.

In step P1624, the printer 150 enters the low-power-consumption mode after the printing operation. Then, the process returns to step P1602.

On the other hand, the mobile terminal 100 performs the following process.

In step K1602, an image file icon is selected by the user. No input is made for the selection of a printer.

In step K1604, the mobile terminal 100 determines whether or not a "Start reception of address via visible light communication" icon has been clicked on. If the "Start reception of address via visible light communication" icon has been clicked on, the process proceeds to step K1606. Otherwise, the mobile terminal 100 is placed on standby until the "Start reception of address via visible light communication" icon has been clicked on.

In step K1606, the mobile terminal 100 brings the visible light sensor into a visible light communication receiving mode. The mobile terminal 100 starts receiving visible light based on the visible light communication standard.

In step U1604, the user performs the following operation. The user positions the mobile terminal 100 so that the visible light sensor of the mobile terminal 100 is exposed to visible light emitted from the printer 150 from which to print.

In step K1608, the mobile terminal 100 determines whether or not the visible light sensor has received visible light based on the visible light communication standard. If the visible light has been received, the process proceeds to step K1610. Otherwise, the mobile terminal 100 waits to receive visible light.

In step K1610, the mobile terminal 100 determines whether or not the received visible light includes the address of the printer 150. If the address of the printer 150 is included, the process proceeds to step K1612. Otherwise, the process returns to step K1608.

In step K1612, the mobile terminal 100 stores the received address of the printer 150 and the received visible light communication number. Then, the mobile terminal 100 cancels the visible light communication receiving mode of the visible light sensor and stops the operation of the visible light sensor.

In step K1614, the mobile terminal 100 provides an audio or visual indication, a vibration, or the like to indicate that light carrying the address of the printer 150 has been received.

In step U1606, when the mobile terminal 100 performs a "process for providing an indication that light carrying the address of the printer 150 has been received", the user performs the following operation. The user moves the mobile terminal 100 to displace the visible light sensor of the mobile terminal 100 away from the area of visible light emitted from the printer 150 from which to print.

The operation of step K1614 is optional. The operation of step K1614 allows the user to be informed of the completion of the reception of light carrying the address of the printer 150. The user is then able to know when to displace the mobile terminal 100 away from the area of visible light emitted from the printer 150.

In step K1616, the mobile terminal 100 creates a print job for printing the image file selected by the user.

In step K1618, the mobile terminal 100 transmits the print job to the received address of the printer 150 by using wireless communication (such as WiFi). The print job may be transmitted by using communication other than WiFi. For example, Bluetooth may be used.

When receiving the address of the printer 150 via visible light communication and transmitting a print job to the printer 150, the mobile terminal 100 creates a print job including the received visible light communication number and transmits the print job. Otherwise (i.e., if the address has not been received via visible light communication but the selection of the address of the destination printer has been input through a user interface), the mobile terminal 100 transmits a print job without including a visible light communication number in the print job.

In step K1620, the print job is transmitted from the mobile terminal 100 to the printer 150. Here, the print job is transmitted via wireless communication (such as WiFi). For example, a printing protocol or email may be used. The print job may also include additional information, namely, a user ID and a password. The print job includes a visible light communication number.

In step K1622, the mobile terminal 100 deletes the address or terminal name of the printer 150, which is received via visible light communication, from a memory. The visible light communication number may also be deleted from the memory. Step K1622 is optional.

Without this exemplary embodiment (with the use of communication based only on WiFi as in the related art), it is necessary to set the address of the printer 150, which is the destination of the print job, in the mobile terminal 100 in advance. This setting operation may be difficult for a user to perform in some cases. For this reason, the address of the printer 150, which is once set, is stored in a non-volatile memory and is re-used for the next transmission of a print job.

This exemplary embodiment may facilitate the reception of the address of the destination printer 150 via visible light communication. This may eliminate the need to store the received address of the printer 150, which is once received, and re-use it. The deletion of the address of the printer 150 may prevent an unwanted printer name from being stored in a printer selection list in the mobile terminal 100, making the printer selection list easier to see to the user, as well as preventing leakage of information related to the printer 150 (leading to improved security).

The example displays given in the examples illustrated in FIG. 7 to FIG. 15 are also applicable to the flowchart illustrated in the example in FIGS. 16 to 19. The details are as follows.

The example display illustrated in FIG. 7 is an example display corresponding to step K1602 and step K1604 in the flowchart.

The example display illustrated in FIG. 8 is an example display corresponding to step K1606 and step U1604 in the flowchart.

The example display illustrated in FIG. 9 is an example display corresponding to steps K1608 to K1614 and step U1606 in the flowchart.

The example display illustrated in FIG. 10 is an example display corresponding to step K1616 and step K1618 in the flowchart.

The example display illustrated in FIG. 11 is an example display corresponding to step K1622 in the flowchart.

The example display illustrated in FIG. 12 is an example display corresponding to step U1602 and step P1604 in the flowchart.

The example display illustrated in FIG. 13 is an example display corresponding to step U1602 and step P1604 (step P2004 and step P2104, described below with reference to an example illustrated in FIG. 20 and FIG. 21) in the flowchart.

The example display illustrated in FIG. 14 is an example display corresponding to step P1620 in the flowchart.

The example display illustrated in FIG. 15 is an example display corresponding to step P1622 in the flowchart.

Figure 20:
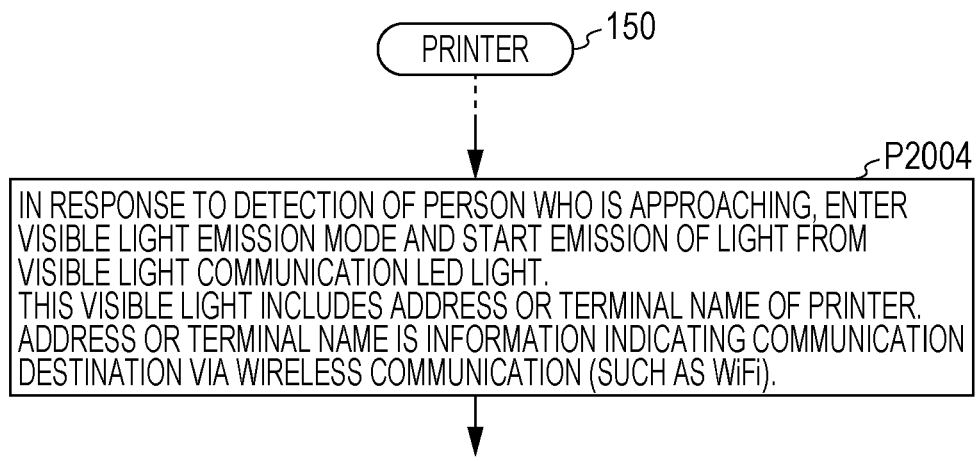
FIG. 20 is a flowchart illustrating an example process according to the exemplary embodiment.

FIG. 20 is a flowchart illustrating an example process according to this exemplary embodiment.

Step P304 in the flowchart illustrated by way of example in FIG. 3 may be replaced with step P2004 illustrated by way of example in FIG. 20. Alternatively, step P1604 in the flowchart illustrated by way of example in FIG. 16 may be replaced with step P2004 illustrated by way of example in FIG. 20.

Figure 16:
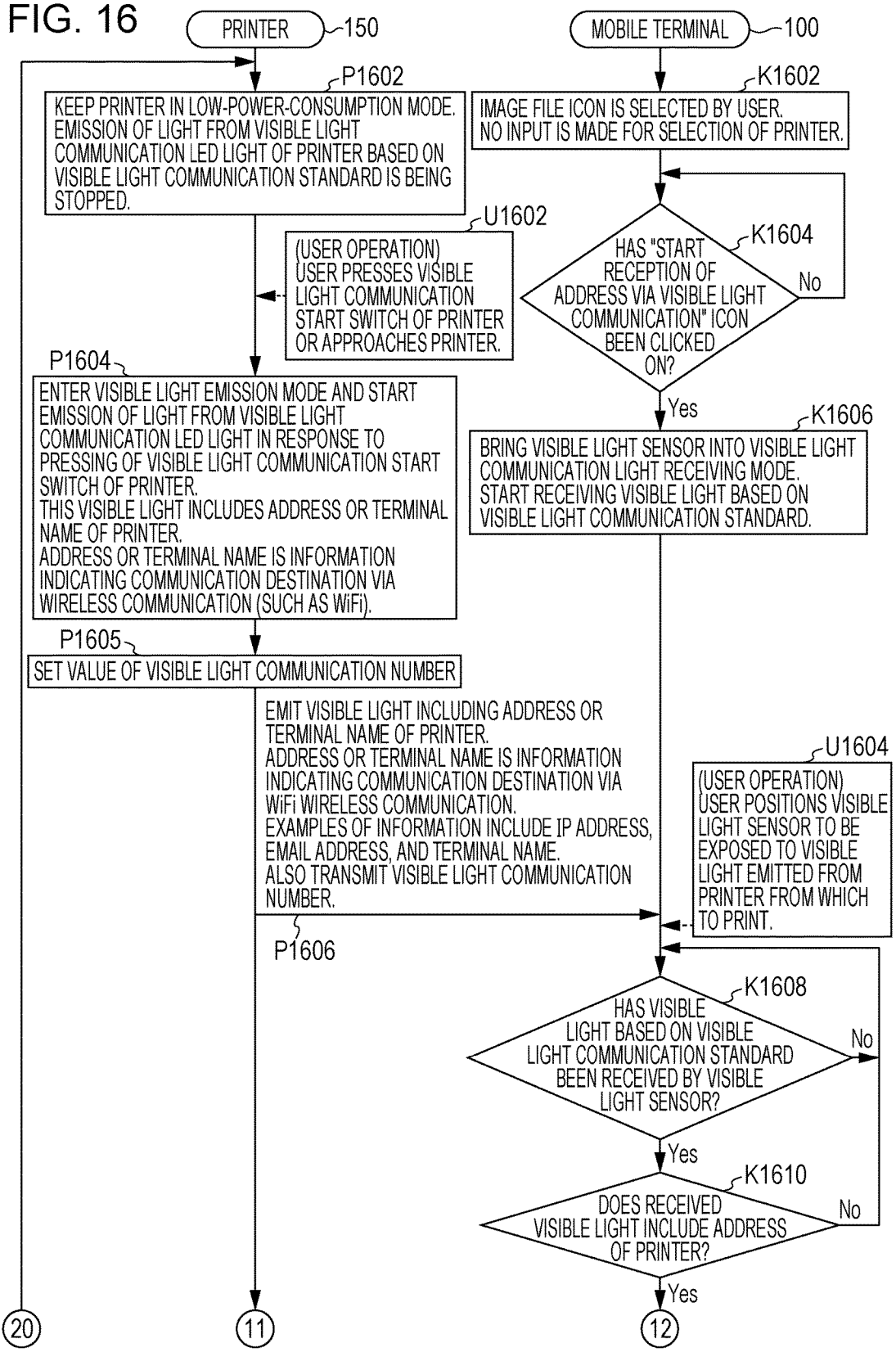
FIG. 16 is a flowchart illustrating an example process according to the exemplary embodiment.
Figure 17:
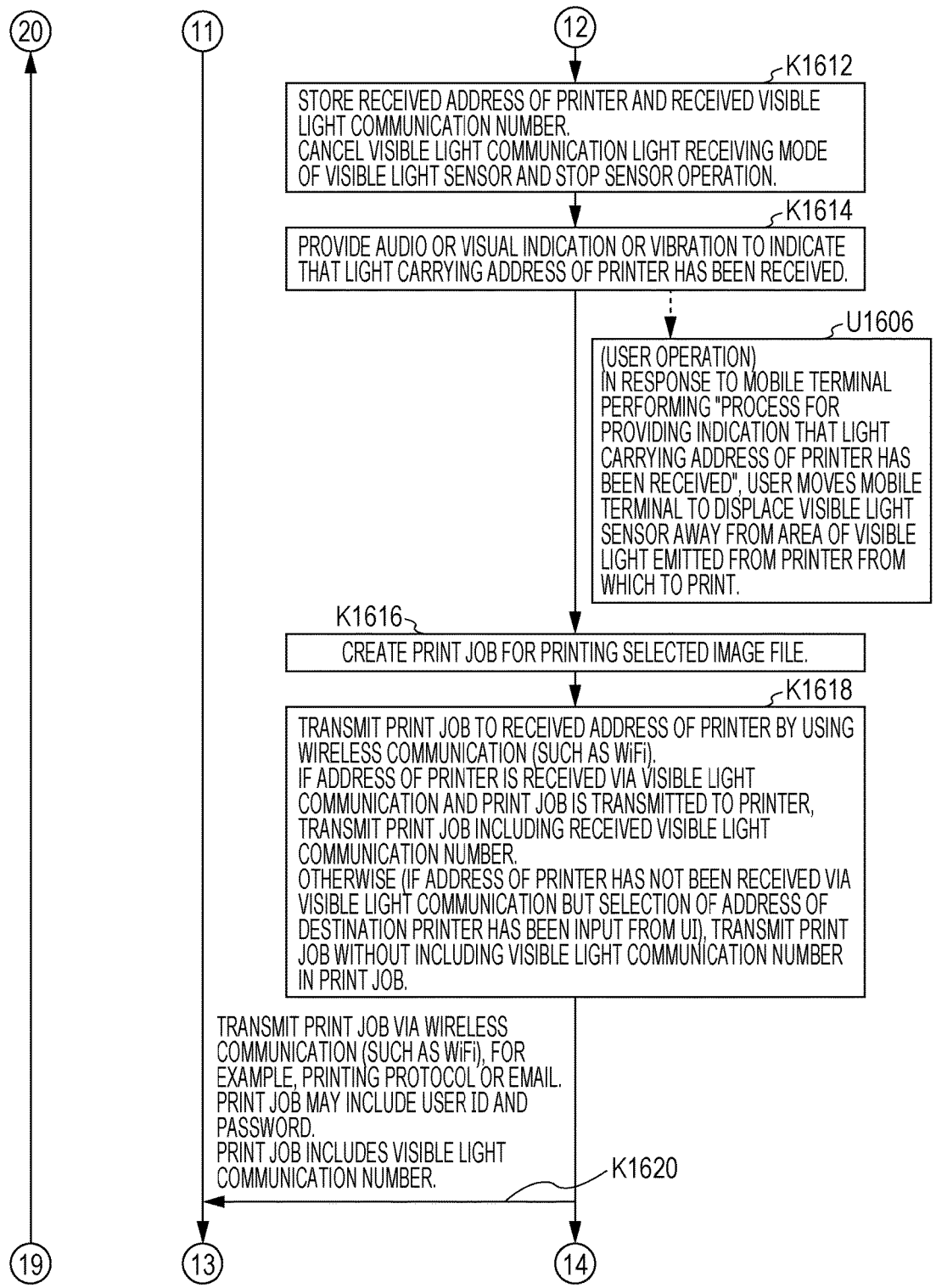
FIG. 17 is a flowchart illustrating the example process according to the exemplary embodiment.
Figure 18:
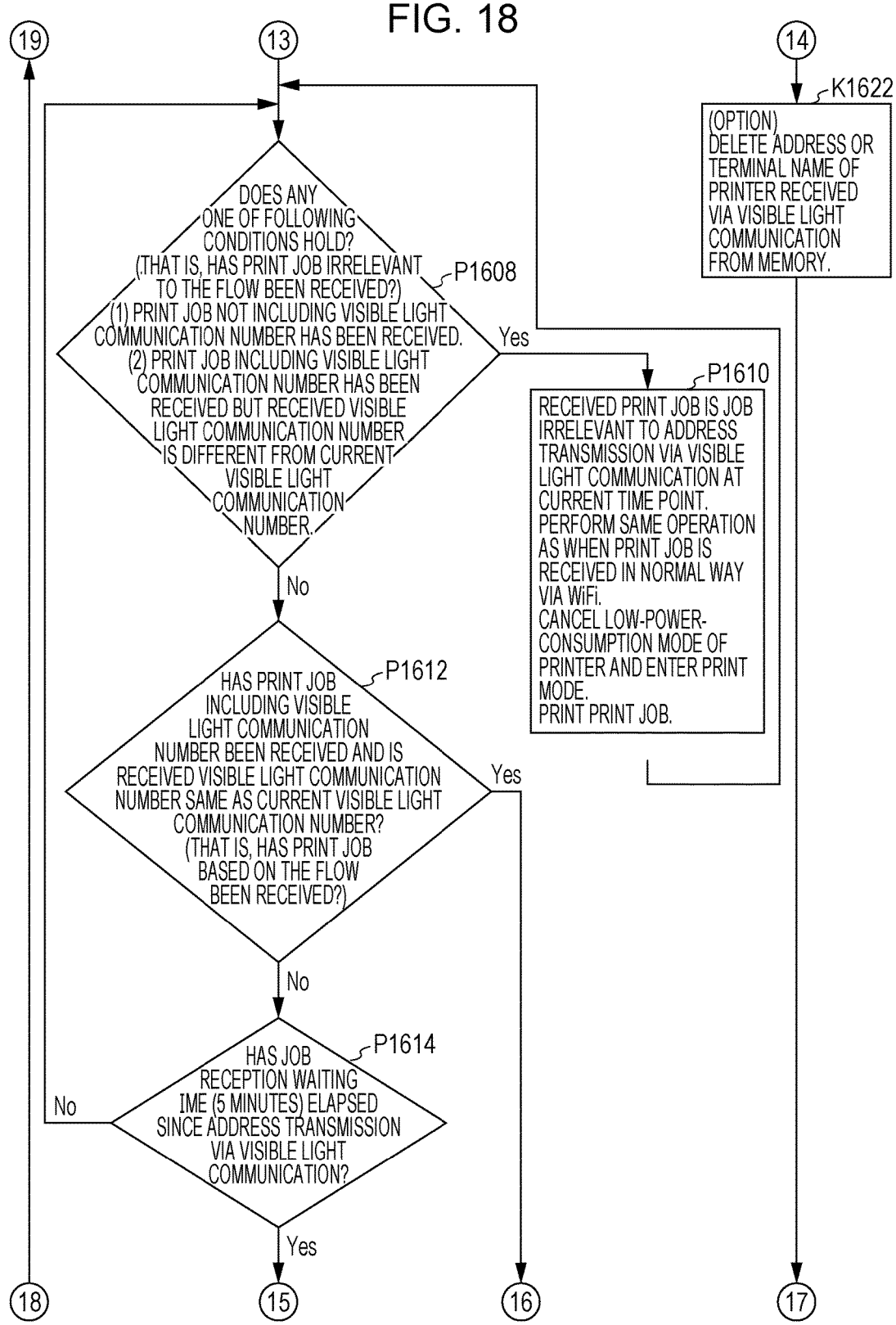
FIG. 18 is a flowchart illustrating the example process according to the exemplary embodiment.
Figure 19:
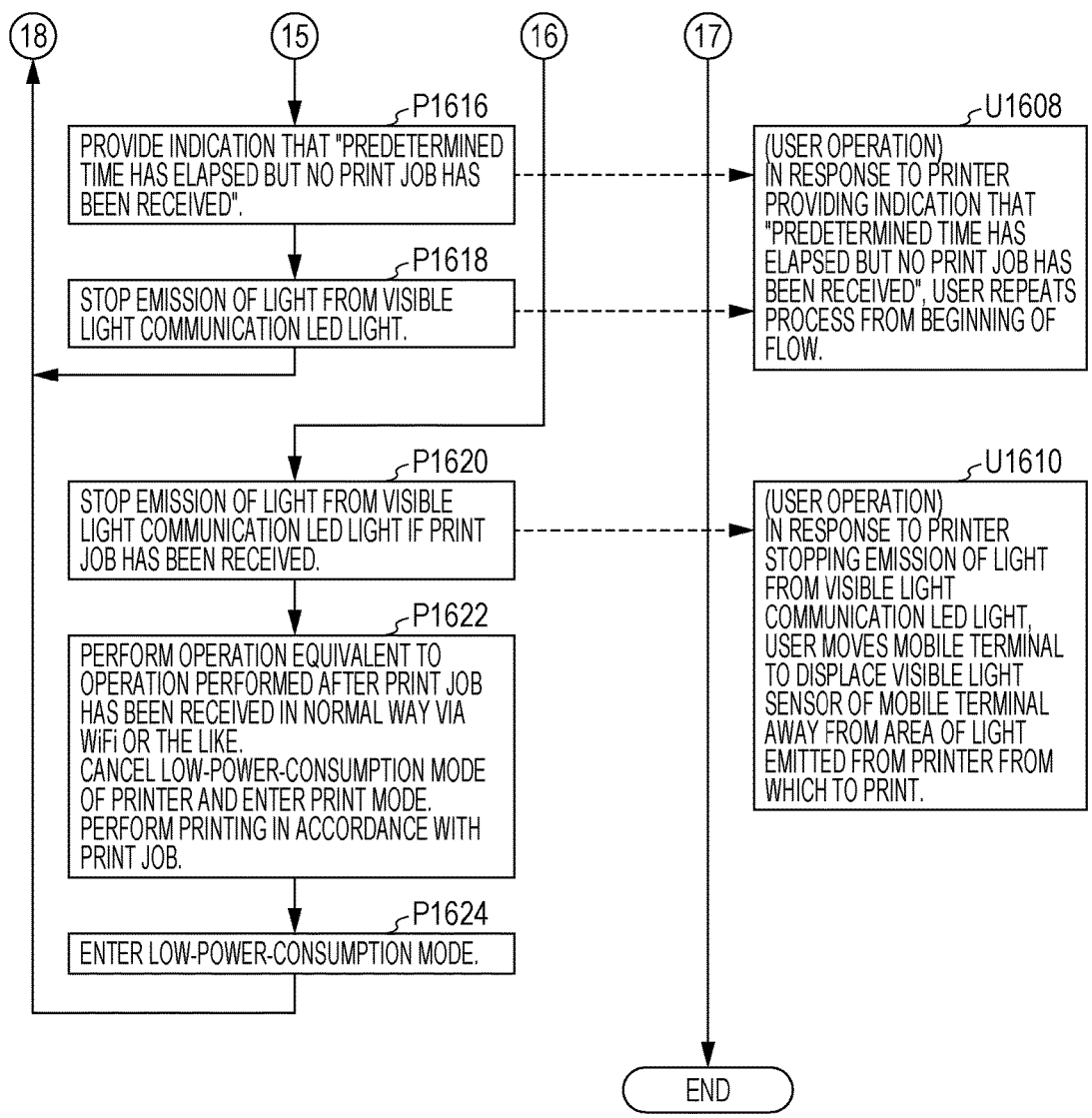
FIG. 19 is a flowchart illustrating the example process according to the exemplary embodiment.

In step P2004, when the printer 150 detects a person who is approaching the printer 150, the printer 150 enters a visible light emission mode and starts emission of light from the visible light communication LED light. The visible light includes the address or terminal name of the printer 150. An address or a terminal name is a piece of information indicating the destination of the communication via wireless communication (such as WiFi). In this case, the switching operation performed by a person, as illustrated by way of example in FIG. 3 or FIG. 16, is no longer necessary.

In step P2004, furthermore, the visible light communication LED light may be caused to emit light only when visible light communication is required (e.g., when a person approaches the printer 150) to reduce power consumption.

Figure 21:
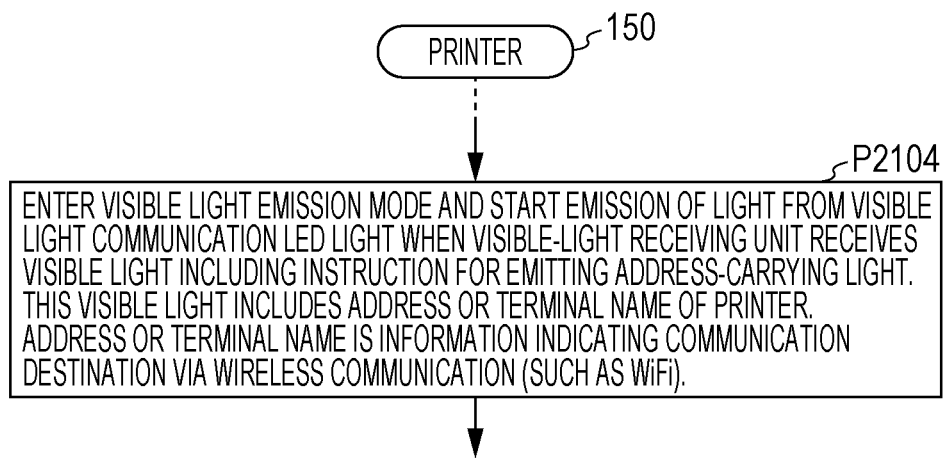
FIG. 21 is a flowchart illustrating an example process according to the exemplary embodiment.

FIG. 21 is a flowchart illustrating an example process according to this exemplary embodiment.

Step P304 in the flowchart illustrated by way of example in FIG. 3 may be replaced with step P2104 illustrated by way of example in FIG. 21. Alternatively, step P1604 in the flowchart illustrated by way of example in FIG. 16 may be replaced with step P2104 illustrated by way of example in FIG. 21.

In step P2104, when the visible-light receiving unit of the printer 150 receives visible light including an instruction for emitting address-carrying light from the mobile terminal 100, the printer 150 enters a visible light emission mode and starts emission of light from the visible light communication LED light. The visible light emitted from the printer 150 includes the address or terminal name of the printer 150. An address or a terminal name is a piece of information indicating the destination of the communication via wireless communication (such as WiFi). In this case, the switching operation performed by a person, as illustrated by way of example in FIG. 3 or FIG. 16, is no longer necessary. In addition, it is also not necessary for a person to approach the printer 150, which is illustrated by way of example in FIG. 20. A person is able to perform the process illustrated by way of example in FIGS. 3 to 6 or FIGS. 16 to 19 (to transmit a print job) at a location distant from the printer 150.

In step P2104, the visible light communication LED light may be caused to emit light only when visible light communication is required (e.g., when visible light including an instruction for emitting address-carrying light is received) to reduce power consumption.

Figure 22:
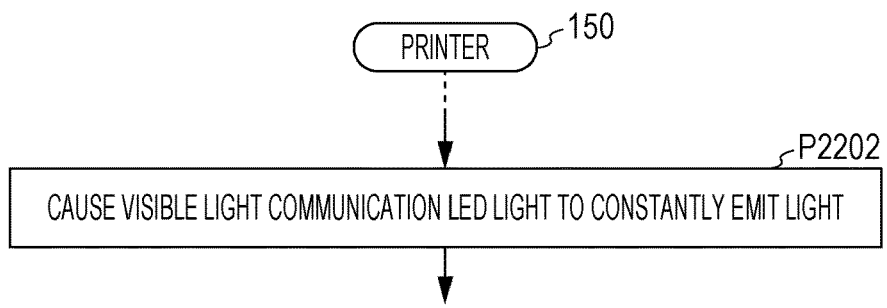
FIG. 22 is a flowchart illustrating an example process according to the exemplary embodiment.

FIG. 22 is a flowchart illustrating an example process according to this exemplary embodiment.

Steps P302, P304, and U302 in the flowchart illustrated by way of example in FIG. 3 may be replaced with step P2202 illustrated by way of example in FIG. 22. Alternatively, steps P1602, P1604, and U1602 in the flowchart illustrated by way of example in FIG. 16 may be replaced with step P2202 illustrated by way of example in FIG. 22.

In step P2202, the printer 150 causes the visible light communication LED light to constantly emit light. The visible light includes the address or terminal name of the printer 150.

In this case, the switching operation performed by a person is no longer necessary, or the transmission of a print job is enabled without requiring a person to approach the printer 150. Alternatively, a process for emitting from the mobile terminal 100 visible light including an instruction for emitting address-carrying light from the mobile terminal 100 is no longer necessary. Power consumption is increased compared to steps P302, P304, and the like, whereas such increased power consumption is within an allowable range.

Figure 23:
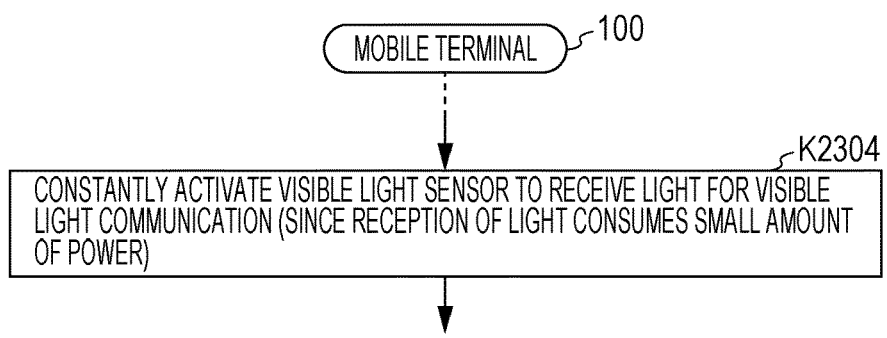
FIG. 23 is a flowchart illustrating an example process according to the exemplary embodiment.

FIG. 23 is a flowchart illustrating an example process according to this exemplary embodiment.

Steps K304 and K306 in the flowchart illustrated by way of example in FIG. 3 may be replaced with step K2304 illustrated by way of example in FIG. 23. Alternatively, steps K1604 and K1606 in the flowchart illustrated by way of example in FIG. 16 may be replaced with step K2304 illustrated by way of example in FIG. 23.

Steps K304 and K306 or steps K1604 and K1606 are those in the flow when the reception of visible light commences after the "Start reception of address via visible light communication" icon has been clicked on.

In step K2304, in contrast, the visible light sensor is constantly activated to receive light for visible light communication. Reception of light consumes a smaller amount of power than that for emission of light. In this case, it is no longer necessary to wait for the "Start reception of address via visible light communication" icon (specifically, the "Receive printer address via visible light and transmit print job via WiFi" icon 722 or the "Receive printer address via visible light and transmit print job via Bluetooth" icon 724 illustrated by way of example in FIG. 7, etc.) to be clicked on. In other words, it is no longer necessary for the user to perform an operation of "clicking on" the "Start reception of address via visible light communication" icon. The user is only required to select an image file icon and receive visible light emitted from the printer 150 by using the mobile terminal 100 to print the selected image file.

Figure 24:
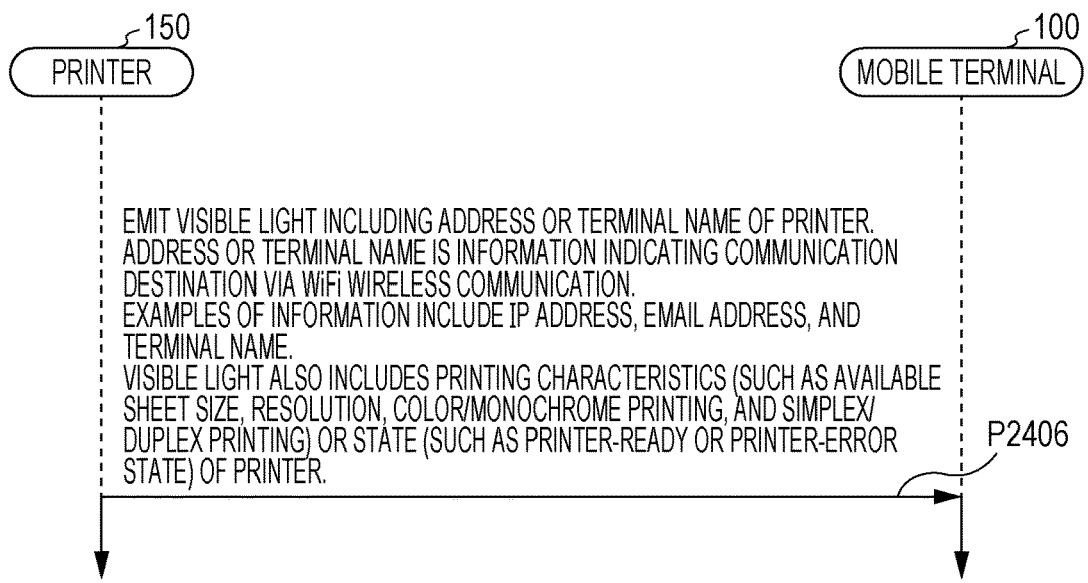
FIG. 24 is a flowchart illustrating an example process according to the exemplary embodiment.

FIG. 24 is a flowchart illustrating an example process according to this exemplary embodiment.

Step P306 in the flowchart illustrated by way of example in FIG. 3 may be replaced with step P2406 illustrated by way of example in FIG. 24. Alternatively, step P1606 in the flowchart illustrated by way of example in FIG. 16 may be replaced with step P2406 illustrated by way of example in FIG. 24.

In step P2406, the printer 150 emits visible light including the address or terminal name of the printer 150 to the mobile terminal 100. The address or the terminal name is a piece of information indicating the destination of the communication via WiFi wireless communication. Examples of the information include an IP address, an email address, and a terminal name. The visible light may also include the printing characteristics of the printer 150 (such as an available sheet size, resolution, color/monochrome printing, and simplex/duplex printing) or the state of the printer 150 (such as the printer-ready or printer-error state).

Figure 25:
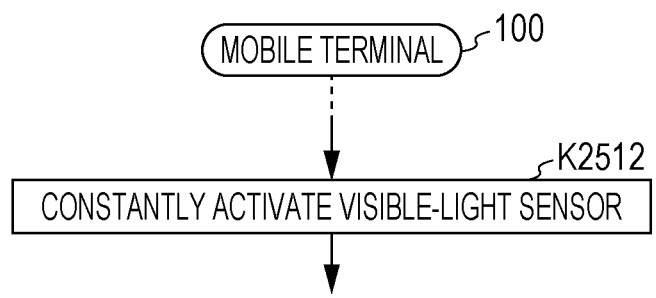
FIG. 25 is a flowchart illustrating an example process according to the exemplary embodiment.

FIG. 25 is a flowchart illustrating an example process according to this exemplary embodiment.

Part of step K312 in the flowchart illustrated by way of example in FIG. 4, namely, "Cancel the visible light communication receiving mode of the visible light sensor and stop the operation of the visible light sensor", may be replaced with step K2512 illustrated by way of example in FIG. 25. In the processing of step K2512, accordingly, the following operation is performed. "The mobile terminal 100 stores the received address of the printer 150. The mobile terminal 100 sets the visible light communication flag to "1". Then, the visible light sensor is kept in operation." Alternatively, part of step K1612 in the flowchart illustrated by way of example in FIG. 17, namely, "Cancel the visible light communication receiving mode of the visible light sensor and stop the operation of the visible light sensor", may be replaced with step K2512 illustrated by way of example in FIG. 25. In the processing of step K2512, accordingly, following operation is performed. "The received address of the printer 150 and the received visible light communication number are stored. Then, the visible light sensor is constantly kept in operation."

In this case, the operation of "canceling the visible light communication receiving mode of the visible light sensor and stopping the operation of the visible light sensor" in step K312 or step K1612 is no longer necessary.

Figure 26:
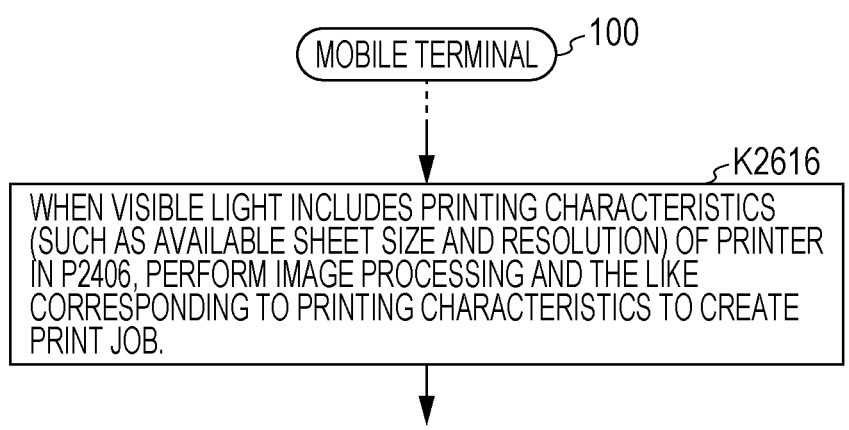
FIG. 26 is a flowchart illustrating an example process according to the exemplary embodiment.

FIG. 26 is a flowchart illustrating an example process according to this exemplary embodiment.

Step K316 in the flowchart illustrated by way of example in FIG. 4 may be replaced with step K2616 illustrated by way of example in FIG. 26. Alternatively, step K1616 in the flowchart illustrated by way of example in FIG. 17 may be replaced with step K2616 illustrated by way of example in FIG. 26.

In step K2616, when the visible light includes the printing characteristics of the printer 150 (such as an available sheet size and resolution) in step P2406, the mobile terminal 100 performs image processing operations and the like that match the printing characteristics (such as providing an instruction to select a sheet, enlarging or reducing the size of an image, and performing conversion from a color image to a black-and-white, or monochrome, image) in accordance with the printing characteristics to create a print job.

An example hardware configuration of the mobile terminal 100 and the printer 150 according to this exemplary embodiment will be described with reference to FIG. 27. The configuration illustrated in FIG. 27 is implemented by a personal computer (PC), for example. An example hardware configuration including a data reading unit 2717, such as a scanner, and a data output unit 2718, such as a printer, is illustrated. The mobile terminal 100 may not necessarily include the data reading unit 2717 or the data output unit 2718.

A CPU 2701 is a controller that executes processing in accordance with a computer program describing the execution sequence of the various modules described in the foregoing exemplary embodiment, namely, the visible light communication module 105, the communication module 110, the communication control module 115, the user interface module 120, the visible light communication module 155, the communication module 160, the communication control module 165, the user interface module 170, the print control module 175, and the printing module 185.

A read only memory (ROM) 2702 stores data used by the CPU 2701, such as programs and computation parameters. A RAM 2703 stores a program used in execution by the CPU 2701 and parameters and the like that change as appropriate in accordance with the execution of the program. The CPU 2701, the ROM 2702, and the RAM 2703 are connected to one another via a host bus 2704. The host bus 2704 is implemented as, for example, a CPU bus.

The host bus 2704 is connected to an external bus 2706 such as a Peripheral Component Interconnect/Interface (PCI) bus via a bridge 2705.

A keyboard 2708 and a pointing device 2709 such as a mouse are devices operable by an operator. A display 2710, examples of which include a liquid crystal display device and a CRT, displays various information as text and/or image information. Alternatively, the display 2710 may be a device having both functions of the pointing device 2709 and the display 2710, such as a touch screen.

A hard disk drive (HDD) 2711 includes a built-in hard disk (or a flash memory or the like). The HDD 2711 drives the hard disk to record or reproduce information and a program to be executed by the CPU 2701. The hard disk implements the functions of the file storage module 125, the file storage module 180, and so on. In addition, other various data, various computer programs, and so on are also stored.

A drive 2712 reads data or a program recorded on a removable recording medium 2713 mounted on the drive 2712, such as a magnetic disk, an optical disk, a magneto-optical disk, or a semiconductor memory, and supplies the data or program to the RAM 2703 connected via an interface 2707, the external bus 2706, the bridge 2705, and the host bus 2704. The removable recording medium 2713 is also available as a data recording area.

A connection port 2714 is a port that connects an external connection device 2715, and has a connection part supporting a standard such as Universal Serial Bus (USB) or IEEE 1394. The connection port 2714 is connected to the CPU 2701 and so on via the interface 2707, the external bus 2706, the bridge 2705, the host bus 2704, etc. A communication unit 2716 is connected to a communication line to execute a process for data communication with external devices. Examples of the communication include, as described above, visible light communication and wireless communication other than visible light communication. The data reading unit 2717 may be a scanner, for example, and is configured to execute a process for reading documents. The data output unit 2718 may be a printer, for example, and is configured to execute a process for outputting document data.

The hardware configuration of the mobile terminal 100 and the printer 150 illustrated in FIG. 27 is an example configuration. The configuration of the exemplary embodiment described above is not limited to the configuration illustrated in FIG. 27 and may be any configuration that makes the modules described in the foregoing exemplary embodiment executable. For example, some of the modules may be implemented as dedicated hardware (such as an application specific integrated circuit (ASIC)), or some of the modules may be included in an external system and connected via a communication line. Alternatively, multiple systems each illustrated in FIG. 27 may be interconnected via a communication line so as to operate in cooperation with each other. In addition, the modules may be incorporated in, in particular, a personal computer or any other device such as a mobile information communication device (such as a mobile phone, a smartphone, a mobile device, or a wearable computer), an information home appliance, a robot, a copier, a facsimile machine, a scanner, a printer, or a multifunction device (an image processing device having two or more functions among the functions of a scanner, a printer, a copier, a facsimile machine, and other suitable devices).

The program described above may be provided after being stored in a recording medium, or may be provided via a communication medium. In some exemplary embodiments, for example, the program described above may be embodied as a "computer-readable recording medium storing the program".

The term "computer-readable recording medium storing the program" refers to a recording medium readable on a computer having the program recorded thereon, which is used for purposes such as installation and execution of the program and distribution of the program.

Examples of the recording medium include digital versatile discs (DVDs), such as discs based on standards created by the DVD Forum, namely, "DVD-R, DVD-RW, and DVD-RAM", and discs based on standards created by the DVD+RW Alliance, namely, "DVD+R and DVD+RW", compact discs (CDs), such as a read-only memory (CD-ROM), a CD-Recordable (CD-R) disc, and a CD-Rewritable (CD-RW) disc, Blu-ray Disc (registered trademark), a magneto-optical (MO) disk, a flexible disk (FD), a magnetic tape, a hard disk, a ROM, an electrically erasable programmable ROM (EEPROM), a flash memory, a RAM, and a secure digital (SD) memory card.

All or part of the program described above may be recorded on the recording medium for storage or distribution, for example. Alternatively, all or part of the program described above may be transmitted via communication by using a transmission medium such as a wired network, a wireless communication network, or a combination thereof that is used for a communication architecture such as a LAN, a metropolitan area network (MAN), a wide area network (WAN), the Internet, an intranet, or an extranet, or may be carried on carrier waves.

Additionally, the program described above may be part or all of another program, or may be recorded on a recording medium together with individual programs. Alternatively, the program may be divided into pieces which are recoded on plural recording media. Moreover, the program may be recorded in any form that is restorable, such as in compressed or encrypted form.

The visible light for use in visible light communication according to the exemplary embodiment described above may be diffused visible light, such as illumination of a ceiling light, or converging visible light, such as illumination of a flashlight. Converging visible light is easier for a user to use than diffused visible light since converging visible light is easier to apply only to the desired destination.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A mobile information processing apparatus comprising:
a light reception device configured to receive destination information via visible light communication, the destination information being information for identifying an image output apparatus as a destination of second communication different from the visible light communication; and
a processor configured to execute a communication device, the communication device being configured to transmit second information and a print instruction to the image output apparatus via the second communication in accordance with the destination information, the second information being information indicating receipt of the destination information by the light reception device,
wherein the second information comprises identification information for identifying the visible light communication, the identification information being information received by the light reception device from the image output apparatus.

2. The mobile information processing apparatus according to claim 1, wherein the second information comprises a flag indicating receipt of the destination information via the visible light communication.

3. The mobile information processing apparatus according to claim 1, wherein the communication device is configured to transmit the print instruction to the image output apparatus without accepting an operation of selecting the image output apparatus, which is a destination of the print instruction.

4. The mobile information processing apparatus according to claim 1, wherein the light reception device is configured to stop receiving the visible light communication upon receipt of the destination information.

5. The mobile information processing apparatus according to claim 1,
   wherein the light reception device is configured to receive a characteristic or state of the image output apparatus from the image output apparatus via the visible light communication,
   wherein the processor is further configured to execute a communication control device configured to generate the print instruction in accordance with the characteristic or state of the image output apparatus, and
   wherein the communication device is configured to transmit the print instruction generated by the communication control device.

6. The mobile information processing apparatus according to claim 1, further comprising
   a display configured to provide, while the destination information is being received via the visible light communication, a user with a suggestion about an operation of positioning the mobile information processing apparatus so that visible light reaches the mobile information processing apparatus.

7. The mobile information processing apparatus according to claim 1, further comprising
   a deletion unit configured to delete the destination information, which is received by the light reception device, after transmission by the communication device.

8. A mobile information processing apparatus comprising:
   a light reception device configured to receive visible light communication; and
   a processor configured to execute a communication device, the communication device being configured to transmit a print instruction to an image output apparatus via second communication different from the visible light communication in accordance with destination information for identifying the image output apparatus as a destination of the second communication,
   the communication device transmitting the print instruction and second information only when the destination information has been received by the light reception device,
   wherein the second information comprises identification information for identifying the visible light communication, the identification information being information received by the light reception device from the image output apparatus.

9. A non-transitory computer readable medium storing a program causing a computer to execute a process for information processing, the process comprising:
   receiving destination information via visible light communication, the destination information being information for identifying an image output apparatus as a destination of second communication different from the visible light communication; and
   transmitting second information and a print instruction to the image output apparatus via the second communication in accordance with the destination information, the second information being information indicating receipt of the destination information,
   wherein the second information includes identification information for identifying the visible light communication, the identification information being information received from the image output apparatus.

10. A non-transitory computer readable medium storing a program causing a computer to execute a process for information processing, the process comprising:
    receiving visible light communication;
    transmitting a print instruction to an image output apparatus via second communication different from the visible light communication in accordance with destination information for identifying the image output apparatus as a destination of the second communication; and
    transmitting the print instruction and second information only when the destination information has been received,
    wherein the second information includes identification information for identifying the visible light communication, the identification information being information received from the image output apparatus.

* * * * *